(12) United States Patent
Jung et al.

(10) Patent No.: US 12,034,585 B2
(45) Date of Patent: Jul. 9, 2024

(54) MODULATION SCHEME CONVERSION DEVICE AND GATEWAY

(71) Applicant: KOREA ADVANCED INSTITUTE OF SCIENCE AND TECHNOLOGY, Daejeon (KR)

(72) Inventors: Jin Hwan Jung, Daejeon (KR); Song Min Kim, Daejeon (KR); Ji Hoon Ryoo, Incheon (KR); Yung Yi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 181 days.

(21) Appl. No.: 17/763,496

(22) PCT Filed: Aug. 3, 2020

(86) PCT No.: PCT/KR2020/010238
§ 371 (c)(1),
(2) Date: Sep. 22, 2022

(87) PCT Pub. No.: WO2021/060694
PCT Pub. Date: Apr. 1, 2021

(65) Prior Publication Data
US 2023/0013763 A1    Jan. 19, 2023

(30) Foreign Application Priority Data
Sep. 24, 2019    (KR) ........................ 10-2019-0117742

(51) Int. Cl.
*H04L 27/36*    (2006.01)
*G06K 19/07*    (2006.01)

(52) U.S. Cl.
CPC .............. *H04L 27/36* (2013.01); *G06K 19/07* (2013.01)

(58) Field of Classification Search
CPC . H04L 27/36; H04L 27/2698; H04L 27/0008; G06K 19/07; H04B 1/59; H04B 10/291; H04W 88/16
See application file for complete search history.

(56) References Cited

U.S. PATENT DOCUMENTS 8,351,490 B2 *    1/2013    Chen .................. H04L 27/0008
                                                    340/10.2
2006/0031378 A1    2/2006    Vallapureddy et al.
(Continued)

FOREIGN PATENT DOCUMENTS

EP            0851639 A2 *    7/1998
KR    10-2010-0089433 A        8/2010
(Continued)

OTHER PUBLICATIONS

International Search Report for PCT/KR2020/010238 mailed Oct. 26, 2020 from Korean Intellectual Property Office.
(Continued)

*Primary Examiner* — Jean B Corrielus
(74) *Attorney, Agent, or Firm* — Paratus Law Group, PLLC

(57) ABSTRACT

A modulation scheme conversion device includes: a backscattering tag to which a tag signal is provided; and a tag signal forming unit for forming a tag signal. The modulation scheme conversion device multiplies a radio signal, which has been modulated in a first modulation scheme, and a tag signal, and reconfigures the multiplied signal by using a second modulation scheme, so as to backscatter the reconfigured signal, wherein the reconfiguration is performed in a physical (PHY) layer.

18 Claims, 19 Drawing Sheets

(56) References Cited

U.S. PATENT DOCUMENTS

| | | | |
|---|---|---|---|
| 2006/0274698 A1 | 12/2006 | Twitchell, Jr. | |
| 2013/0299579 A1* | 11/2013 | Manku | G06K 19/0701 |
| | | | 343/745 |
| 2013/0300619 A1* | 11/2013 | Manku | G06K 19/07786 |
| | | | 343/750 |
| 2015/0091706 A1 | 4/2015 | Chemishkian et al. | |
| 2019/0089571 A1* | 3/2019 | Von Novak, III | H04L 1/0003 |
| 2019/0173728 A1* | 6/2019 | Chang | H04L 27/2698 |

FOREIGN PATENT DOCUMENTS

| | | | | |
|---|---|---|---|---|
| KR | 10-2017-0010017 A | | 1/2017 | |
| WO | WO-2014008576 A1 * | | 1/2014 | G01S 13/756 |

OTHER PUBLICATIONS

Korean Office Action for related KR Application No. 10-2020-0100538 mailed May 27, 2021 from Korean Intellectual Property Office.

Pengyu Zhang et al., "HitchHike: Practical Backscatter Using Commodity WiFi", SenSys 16 Proceedings of the 14th ACM Conference on Embedded Network Sensor Systems, Nov. 2016, pp. 259-271.

* cited by examiner

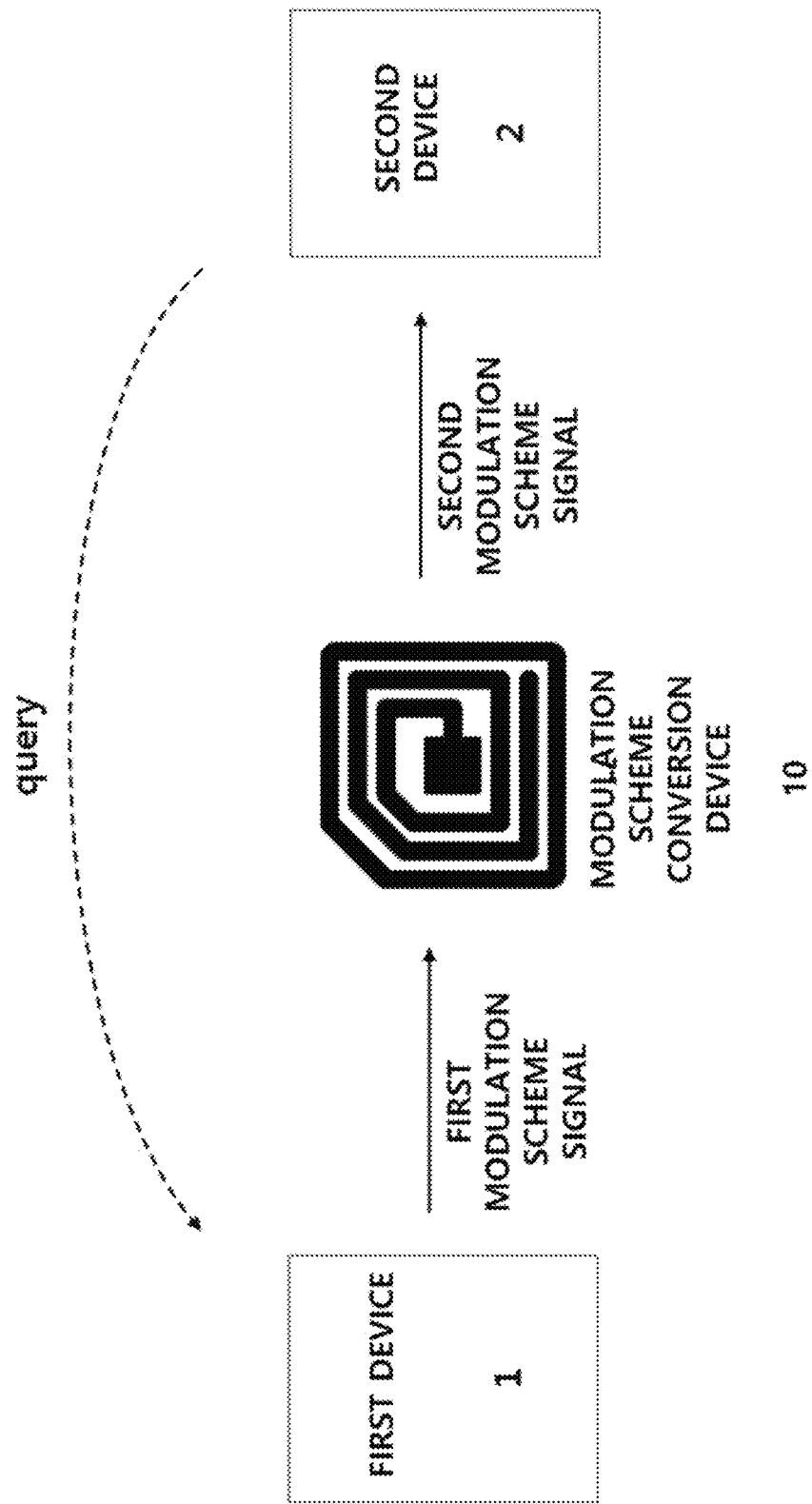

FIG. 18
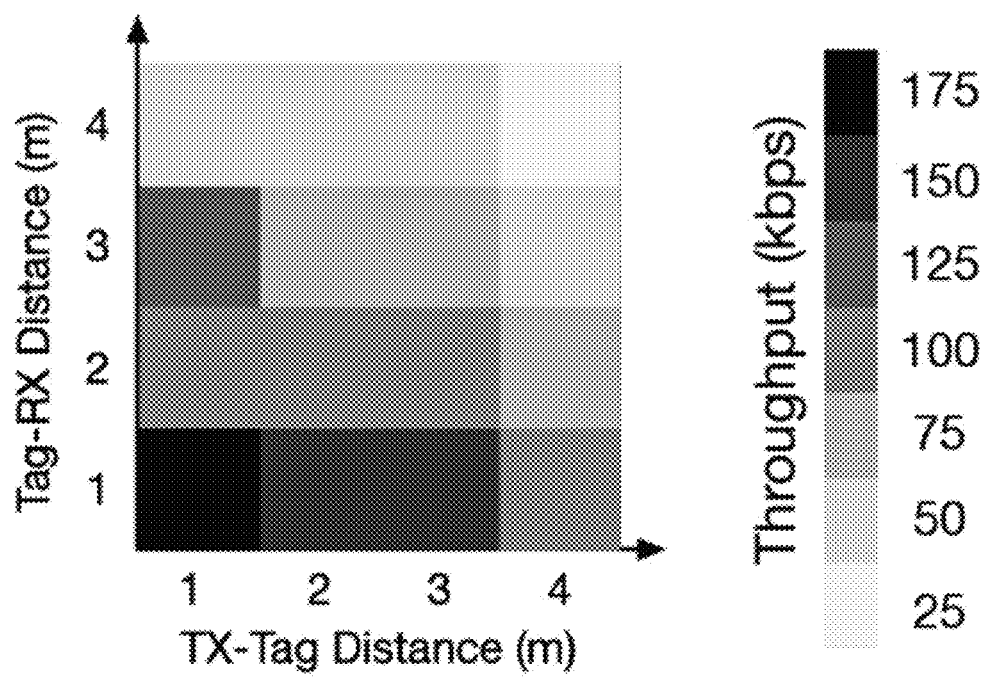
FIG. 19A          FIG. 19B
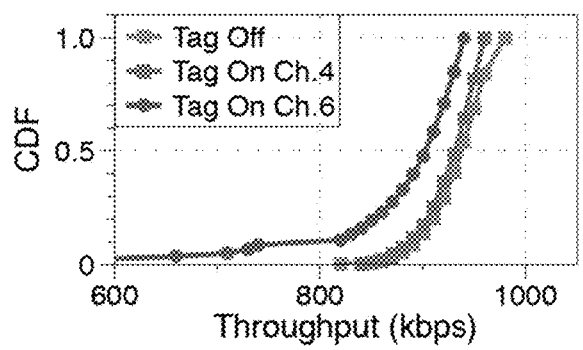
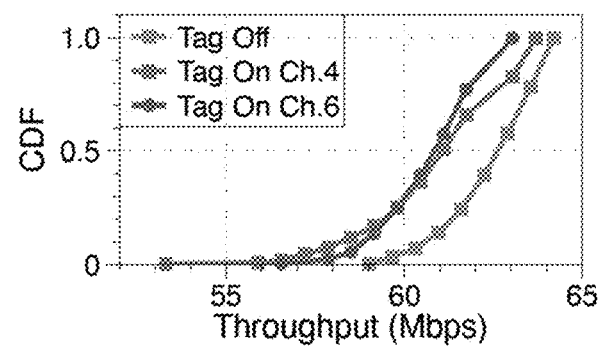

MODULATION SCHEME CONVERSION DEVICE AND GATEWAY

CROSS-REFERENCE TO PRIOR APPLICATIONS

This application is a National Stage Patent Application of PCT International Patent Application No. PCT/KR2020/010238 (filed on Aug. 3, 2020) under 35 U.S.C. § 371, which claims priority to Korean Patent Application No. 10-2019-0117742 (filed on Sep. 24, 2019), which are all hereby incorporated by reference in their entirety.

BACKGROUND

The present technology generally relates to a modulation scheme conversion device and a gateway.

The Internet of Things (IoT) era is rapidly emerging with the explosive growth of wireless devices which cover every corner of our living space. The core of IoT is a pervasive Internet connection, and IoT is intended to provide services without temporal and spatial limitations. IoT devices are equipped with low-power wireless devices and rely on multi-radio gateways for connection to WiFi networks and the Internet. Consequently, Internet connectivity of IoT devices is dependent on the gateway deployment.

SUMMARY

Despite the importance of pervasive gateway supply in Internet of Things (IoT) service performance, current gateways have some limiting factors that hinder huge supply. (i) Gateways are equipped with a multi-radio interface, which means that it is necessary to supply power from the outside. This limits outdoor deployment and mobility. (ii) Gateways are expensive. (iii) Gateways vary by vendor, and thus manufacturers have their own gateway standards. Such incompatibility works as another limiting factor in supporting widely used gateways.

To solve the above-described problems, the present technology is directed to providing an extendable, low-cost, low-energy, and general-use (e.g., among vendors) solution that provides Internet connectivity of IoT.

One aspect of the present disclosure provides a modulation scheme conversion device including: a backscattering tag to which a tag signal is provided and a tag signal generation unit configured to generate the tag signal. The modulation scheme conversion device multiplies a radio signal, which has been modulated with a first modulation scheme, and the tag signal to reshape the multiplied signal using a second modulation scheme and backscatters the reshaped signal, wherein the reshaping is performed in a physical (PHY) layer.

Another aspect of the present disclosure provides a gateway including a modulation scheme conversion device, which includes a backscattering tag and a tag signal generation unit configured to provide a tag signal to the backscattering tag. The modulation scheme conversion device multiplies a radio signal, which has been modulated with a first modulation scheme, and the tag signal to reshape the multiplied signal using a second modulation scheme and backscatters the reshaped signal, wherein the signal, which is reshaped with the second modulation scheme and backscattered, is provided to a receiver of second modulation scheme signals and then provided to the Internet.

According to a modulation scheme conversion device and a gateway of the present technology, it is possible to convert a first modulation scheme signal with a second modulation scheme in a physical (PHY) layer without interfering with or interpreting data such that high security performance is advantageously provided. Also, according to the present technology, a modulation scheme conversion device and a gateway that can access the Internet for general use without limitations in modulation scheme are advantageously provided.

BRIEF DESCRIPTION OF THE DRAWINGS

FIG. 1 is a diagram schematically illustrating operations of a modulation scheme conversion device (10).

(10) in the ZigBee-to-WiFi LoS scenario.

FIG. 18 is a diagram showing the impact of varying the distance between a TX and the modulation scheme conversion device in a ZigBee-to-WiFi experimental environment.

FIG. 19 is a set of diagrams showing the impact of backscattering of the modulation scheme conversion device (10) on a WiFi network and the impact of an existing WiFi network on backscattering of the modulation scheme conversion device.

DETAILED DESCRIPTION

Figure 2A:
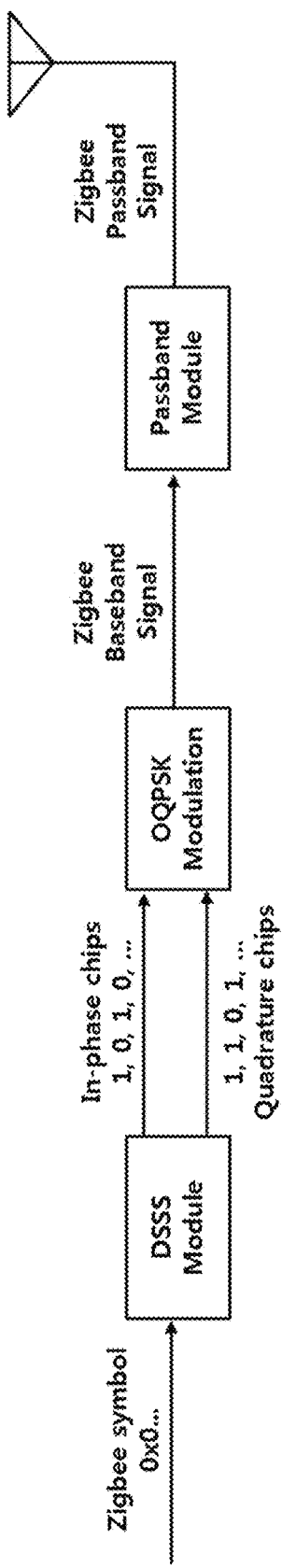
FIG. 2A is a diagram showing a structure of a ZigBee signal transmitter.

Hereinafter, a modulation scheme conversion device according to the present embodiment will be described with reference to the accompanying drawings. FIG. 1 is a diagram schematically illustrating operations of a modulation scheme conversion device 10. Referring to FIG. 1, a first device (Internet of Things (IoT) device) 1 outputs a radio signal of a first modulation scheme. The first device 1 illustrated in FIG. 1 is a device that outputs radio signals with the first modulation scheme. Any device that outputs radio signals in a wireless modulation scheme can be the first device, and there is no limitation. For example, the first device 1 may be an IoT device.

The first device 1 may wake up at a preset time to perform a preset operation and provide data of the first modulation scheme. According to another embodiment, a second device 2 may provide a query signal to the first device 1, and the first device 1 performs an operation corresponding to the query to provide data.

According to an embodiment, the first device 1 performs the operation corresponding to the query provided by the second device 2 and provides a result of performing the operation as a first modulation scheme signal. As an example, the first device 1 may be a temperature sensor. In this case, when the second device 2 provides a temperature detection query to the first device 1, the first device 1 may detect a temperature and output the corresponding information as a first modulation scheme signal. The first device 1 may be an IoT device and provide a signal in a modulation scheme corresponding to a protocol, such as ZigBee, Bluetooth low energy (BLE), etc.

The second device 2 may be a WiFi receiver connected to the Internet. The first device 1 may be connected to the Internet through a signal converted by the modulation scheme conversion device 10. Accordingly, the modulation scheme conversion device 10 functions as a radio gateway.

The second device 2 may directly provide the query signal to the first device through cross-technology communication (CTC), such as WEBee and the like. Also, the modulation scheme conversion device 10 may be woken up by the query signal. For example, the query signal may be a plurality of packets of the on-off keying (OOK) modulation scheme.

The modulation scheme conversion device 10 may include a low-power envelope detector. When the low-power envelope detector recognizes the query signal, the modulation scheme conversion device 10 wakes up and waits for a first modulation scheme signal provided by the first device 1.

A signal packet provided by the first device 1 may be converted into a second modulation scheme signal by the modulation scheme conversion device 10 and provided to the second device. For example, the modulation scheme conversion device 10 may detect a signal provided by the first device using the envelope detector (not shown). The modulation scheme conversion device 10 converts packets of the signal provided by the first device with the second modulation scheme and backscatters the converted packets to the second device.

According to an embodiment not shown in the drawings, the modulation scheme conversion device 10 may backscatter signals provided by a plurality of first devices to second devices.

When a radio signal of the first modulation scheme is provided to the modulation scheme conversion device 10 according to the present embodiment, a tag signal and the first modulation scheme signal are multiplied together to generate a signal of the second modulation scheme, and the second modulation scheme signal is backscattered. According to an embodiment, the modulation scheme conversion device 10 may include a backscattering tag. As an example, the modulation scheme conversion device 10 may operate by collecting power through energy harvesting.

The modulation scheme conversion device 10 may further include an energy harvesting unit for collecting energy, and the energy harvesting unit may include an antenna for collecting energy from electric waves and any one of an electric storage unit including a capacitor or lithium battery and a panel for collecting energy through the photoelectric effect.

As another example, the modulation scheme conversion device 10 may operate as a rechargeable battery. As still another example, the modulation scheme conversion device 10 may operate as a primary cell, such as a coin cell or the like. The second device 2 may receive a signal of the second modulation scheme and recover intended data.

The modulation scheme conversion device 10 according to the present embodiment converts a first modulation scheme signal into a second modulation scheme signal without limitations on modulation schemes. Operations of the modulation scheme conversion device 10 will be described below according to each embodiment. However, the embodiments should be construed as being simply intended to describe operations of the modulation scheme conversion device 10 and do not limit operations of the modulation scheme conversion device 10.

First Embodiment

To describe the modulation scheme conversion device 10, a case in which a first modulation scheme signal is a ZigBee signal and a second modulation scheme signal is an 802.11b WiFi signal will be illustrated as a first embodiment. Since the data transmission rate of ZigBee signals is 250 kbps and the minimum data transmission rate of 802.11b WiFi is 1 Mbps, a ZigBee signal may be sufficiently supported. Further, a WiFi device has backward compatibility and thus may receive 802.11b WiFi data without problems.

Figure 2B:
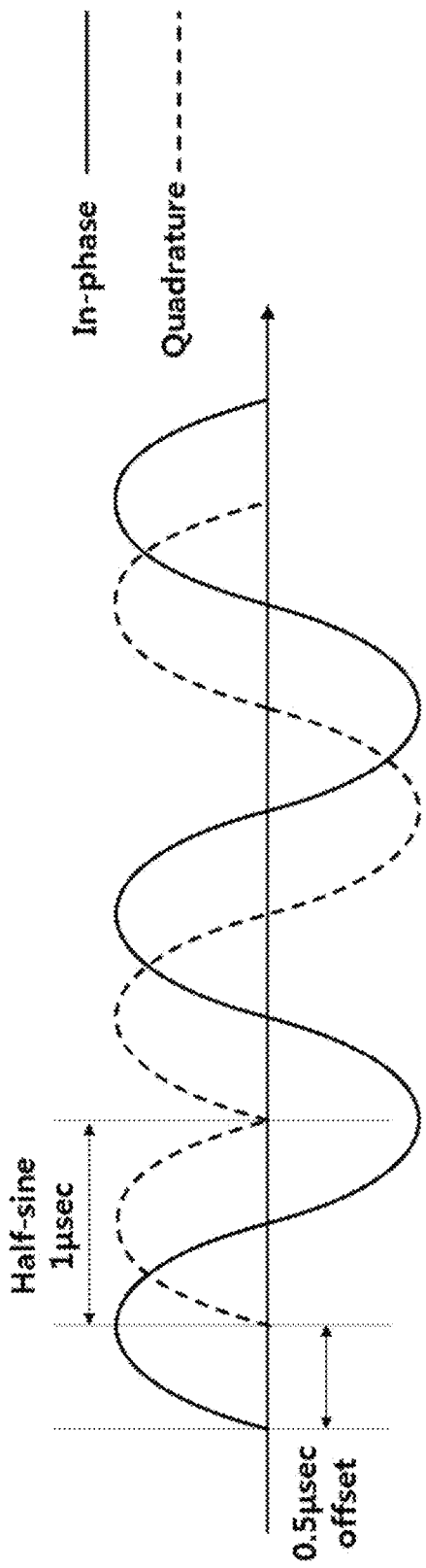
FIG. 2B is a diagram showing an example of a ZigBee signal.

FIG. 2A is a diagram showing a structure of a ZigBee signal transmitter, and FIG. 2(b) is a diagram showing an example of a ZigBee signal. Referring to FIG. 2A, ZigBee symbols 0 to F are first spread over 32 chips (0 and 1) through a mapping table of a direct sequence spread spectrum (DSSS) module, and a series of chips is allocated by turns to in-phase and quadrature. The chips 0 and 1 are modulated into a positive half-sine signal and a negative half-sine signal having a length of 1 μsec, respectively. FIG. 2B shows an example of baseband signals of a positive half-sine signal and a negative half-sine signal. The offset between in-phase and quadrature is 0.5 μsec. Accordingly, a modulation scheme of ZigBee signals is offset quadrature phase shift keying (OQPSK).

Figure 3A:
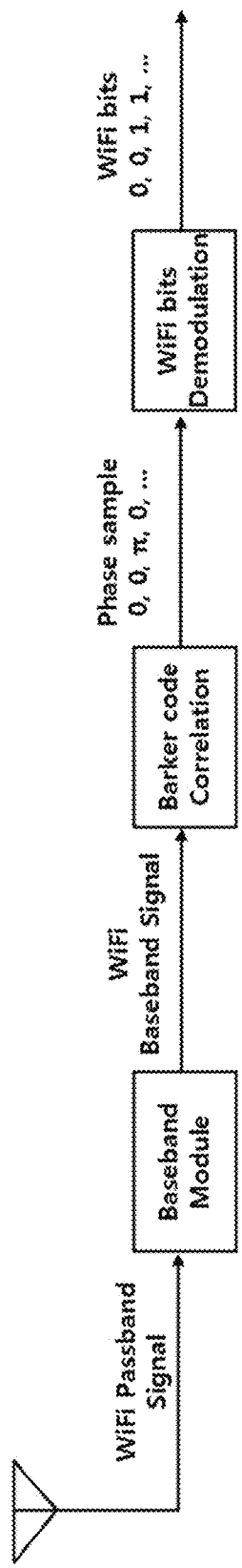
FIG. 3A is a diagram showing a WiFi (802.11b) receiver structure.
Figure 3B:
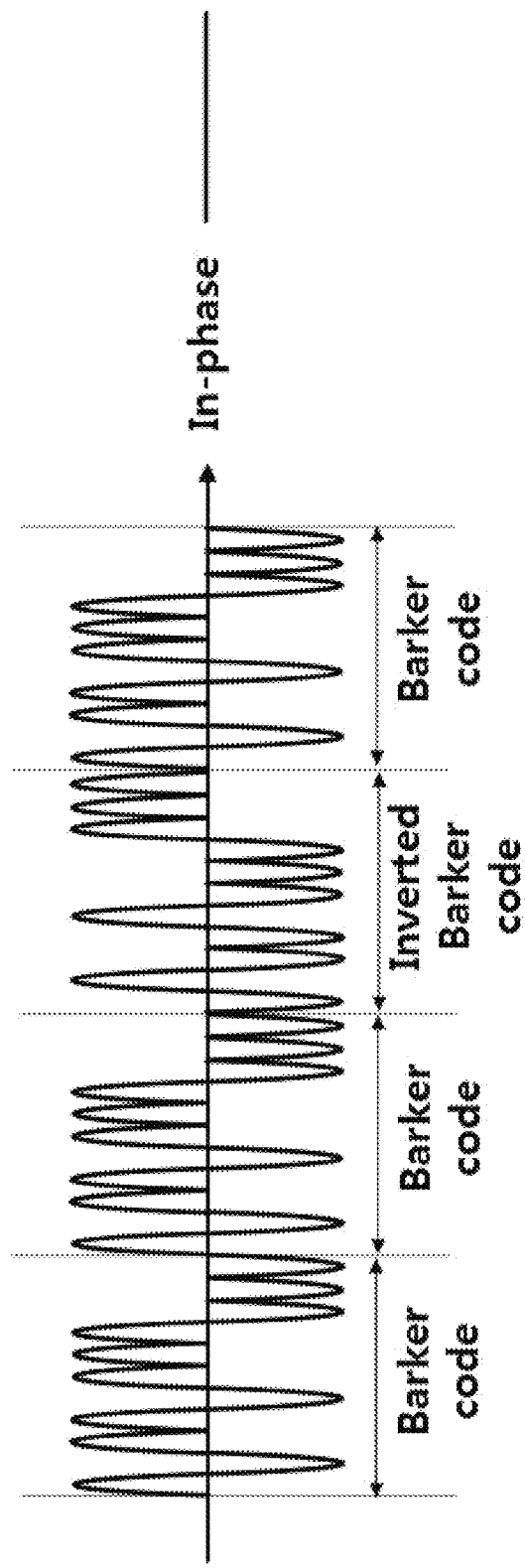
FIG. 3B is a diagram showing an example of a WiFi signal including Barker code and inverted Barker code having a phase difference of $\pi$ and a length of 1 μsec.

FIG. 3A is a diagram showing a WiFi (802.11b) receiver structure, and FIG. 3B is a diagram showing an example of a WiFi signal including a Barker code and an inverted Barker code having a phase difference of IT, which is a WiFi keying signal, and a length of 1 μsec. When a general WiFi receiver receives a signal, the signal is down-converted into the baseband. ZigBee signals include both in-phase components (i.e., a real signal) and quadrature components (i.e., a complex signal), whereas WiFi signals contains only in-phase components (i.e., a real signal). Barker code of the received signal is detected through correlation with an ideal Barker code, which is a WiFi keying signal, and a correlation value greater than a specific threshold denotes that a Barker code has been detected. The transition between consecutive Barker codes (i.e., between a non-inverted Barker code and an inverted Barker code or between an inverted Barker code and a non-inverted Barker code) is indicated by a bit of 1, and others are indicated by a bit of 0. Accordingly, such a modulation scheme is differential binary phase shift keying (DBPSK).

The modulation scheme conversion device 10 according to the present embodiment includes the backscattering tag. The backscattering tag is a device that reflects and provides a radio signal in the air. The backscattering tag may be supplied with power from a battery or charged with power by performing energy harvesting. A signal reflected by the backscattering tag may be represented as the product of a radio frequency (RF) signal of the passband and a tag signal in the time domain. Accordingly, the passband RF signal may be wirelessly reshaped by controlling the tag signal.

In the modulation scheme conversion device 10, a ZigBee signal is reshaped to approximate a WiFi signal through signal reshaping. The signal reshaping process may be performed without conversion or interpretation of data or a packet structure included in the signal or moving the data from a physical (PHY) layer to an upper layer, and the signal reshaping process is applied in bit units.

According to an embodiment, signal reshaping operates at a passband of 2.4 GHz without a power-consuming GHz oscillator which is used for bringing down the frequency of a signal to the baseband. Accordingly, the modulation scheme conversion device 10 according to the present embodiment may operate with power collected through energy harvesting and the like.

The modulation scheme conversion device 10 according to the present embodiment uses the property that the frequency and phase transition performed at the passband influence a baseband operation at the receiver and directly affect decoding. In Equation 1 below, S(t) and $f_c$ indicate a baseband signal and a carrier frequency, respectively. When a frequency and phase of the tag signal of the modulation scheme conversion device 10 according to the present embodiment are $f_T$ and $\theta_T$, the reshaped signal may be represented as the product of the signal of the passband and the tag signal as shown in Equation 1.

[Equation 1]

$$\underbrace{S(t)e^{j2\pi f_c t}}_{passband\ signal} \cdot \underbrace{e^{j(2\pi f_T t + \theta_T)}}_{tag\ signal}$$

The receiver receives the reshaped signal and provides it to a mixer and a low-pass filter. This yields $S(t)e^{j(2\pi f_T t + \theta_T)}$, denoting that the received WiFi signal reflects the frequency and phase of the tag signal of the modulation scheme conversion device 10. This validates that the signal reshaping can be performed at the passband.

Figure 4A:
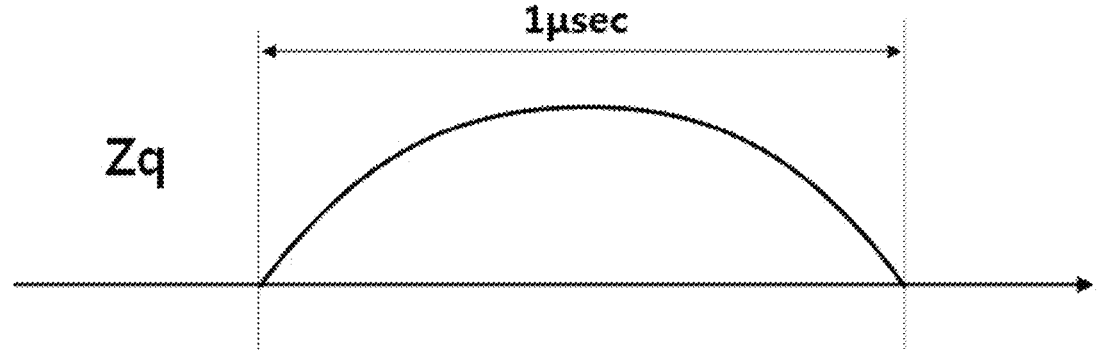
FIGS. 4A to 4C show an example in which a ZigBee signal of a quadrature phase shift keying (OQPSK) modulation scheme is reshaped into a WiFi signal of a differential binary phase shift keying (DBPSK) modulation scheme.
Figure 4B:
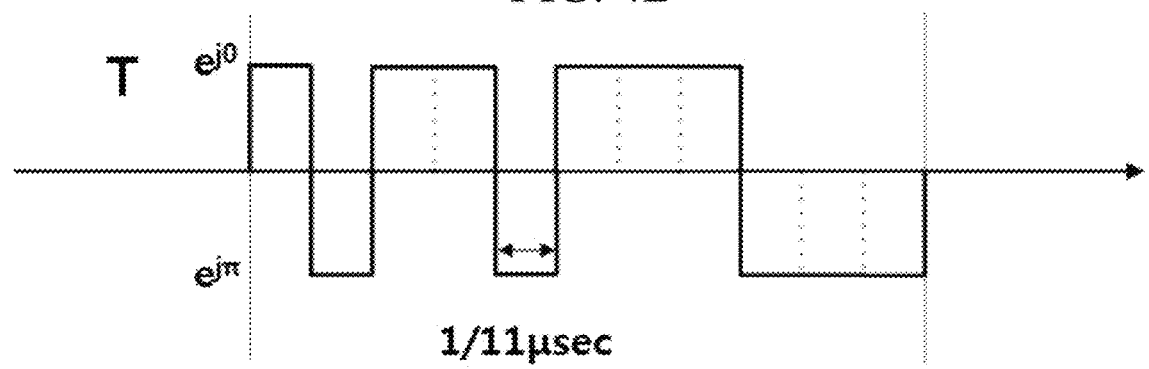
Figure 4C:
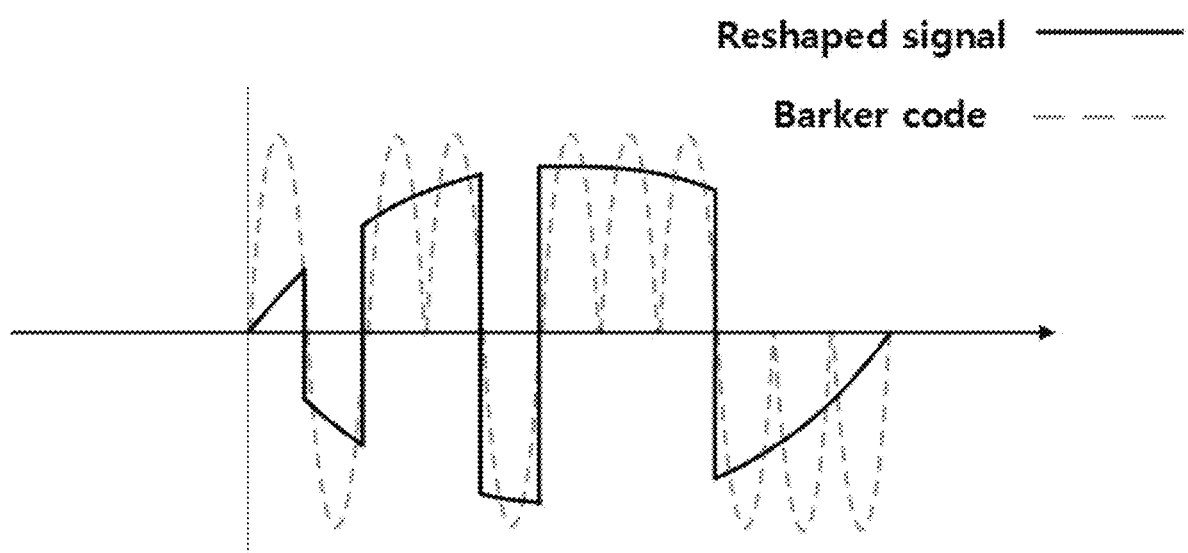

Signal reshaping can be used even between first and second modulation scheme signals with a bandwidth gap and disparate modulations. FIGS. 4A to 4C show an example in which a ZigBee signal of the OQPSK modulation scheme is reshaped into a WiFi signal of the DBPSK modulation scheme. A half-sine signal, which is a ZigBee quadrature component Zq having a bandwidth of 2 MHz, illustrated in FIG. 4A is multiplied by a tag signal T illustrated in FIG. 4B.

The quadrature component Zq of the ZigBee signal is used in lossless decoding at the WiFi receiver, which will be described below. In the signal reshaping process, the ZigBee quadrature component Zq signal having a 2 MHz bandwidth is multiplied by the tag signal of the modulation scheme conversion device 10 having a higher frequency such that the bandwidth is expanded to correspond to the 22 MHz WiFi band. Accordingly, when signal reshaping is performed on the first modulation scheme signal, the first modulation scheme signal can be reshaped to approximate the second modulation scheme signal with a bandwidth gap, overcoming the bandwidth gap.

When the ZigBee signal is a positive half-sine signal, the reshaped signal (see FIG. 4C) is subjected to a correlation operation with a non-inverted Barker code, which is a WiFi keying signal. When the ZigBee signal is a negative half-sine signal, the reshaped signal is subjected to a correlation operation with an inverted Barker code, which is a WiFi keying signal, at the WiFi receiver.

The tag signal T of the modulation scheme conversion device 10 illustrated in FIG. 4B outputs an inverted Barker code or a non-inverted Barker code of a backscattered signal to reflect ZigBee data (i.e., ±half sine). In other words, when decoded bits are interpreted at the WiFi receiver, it is possible to recover bits originally transmitted as a ZigBee signal, which will be described below.

In terms of implementation feasibility, the tag signal of the modulation scheme conversion device 10 illustrated in FIG. 4B has a dominant frequency component of 22 MHz with a phase changing between 0 and π at least every 1/11 μsec. As will be described below, this can be easily generated using a low-power ring oscillator, which stably operates at 36 MHz or more with only 9.7 μW power consumption.

The WiFi receiver detects inverted and non-inverted Barker code with a correlation threshold of 2/11 and −2/11. The correlation is computed as the cross-correlation between the received signal and the inverted or non-inverted Barker code. The transition of non-inverted Barker code ↔ inverted Barker code between consecutive Barker codes is interpreted as a bit of 0 (no transition) and 1 (transition). The threshold is set to be very low for robustness of WiFi signal detection. Due to this low threshold, there are many feasible tag signals that can be used for signal reshaping (i.e., have higher correlation than the threshold). FIG. 4(b) shows an example of the tag signal of the modulation scheme conversion device 10 which reaches the maximum correlation operation value of 0.69. For example, the tag signal T may have a sequence: T=[1 −1 1 1 −1 1 1 1 −1 −1 −1].

S is assumed to be a set of signals of the modulation scheme conversion device 10 with a correlation operation value exceeding the threshold. Among the signals, an optimal tag signal is selected to reshape only a target signal (i.e., quadrature components). This will be described below.

The ZigBee signal of the OQPSK modulation scheme contains both in-phase components and quadrature components, whereas the WiFi signal of the DBPSK modulation scheme contains only in-phase components. Accordingly, the modulation scheme conversion device 10 according to the present embodiment is required to select a target signal to be provided with a converted modulation scheme. To solve this problem, the modulation scheme conversion device 10 selects only quadrature components of a ZigBee signal when generating WiFi packets containing data. The signal selection is done in the passband. Signal reshaping done in the passband simultaneously affects in-phase components and quadrature components. In terms of the system, selecting quadrature components is equivalent to synchronizing the WiFi receiver with the reshaped quadrature signal.

Figure 5A:
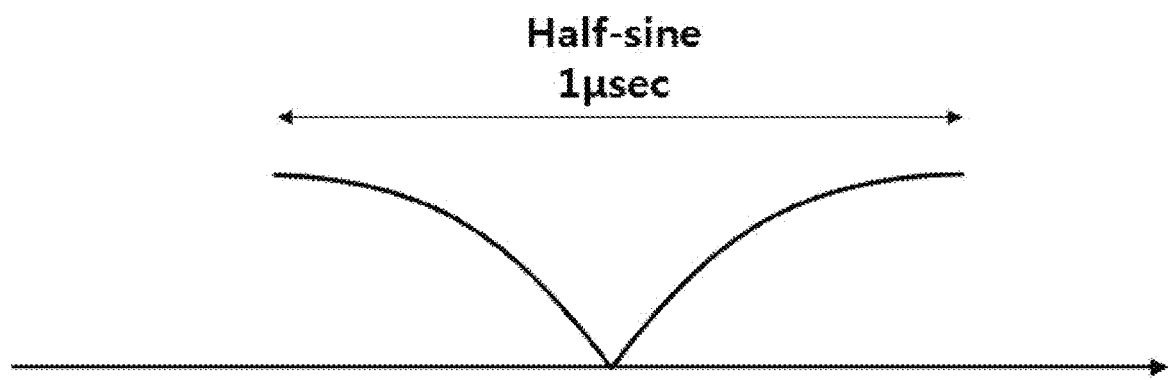
FIG. 5A is a diagram illustrating an in-phase component of a ZigBee signal, and in FIG. 5B, a signal indicated by a solid line is a signal reshaped using an exemplary tag signal of the modulation scheme conversion device 10 illustrated in FIG. 4B, and a signal indicated by a broken line is a Barker code.
Figure 5B:
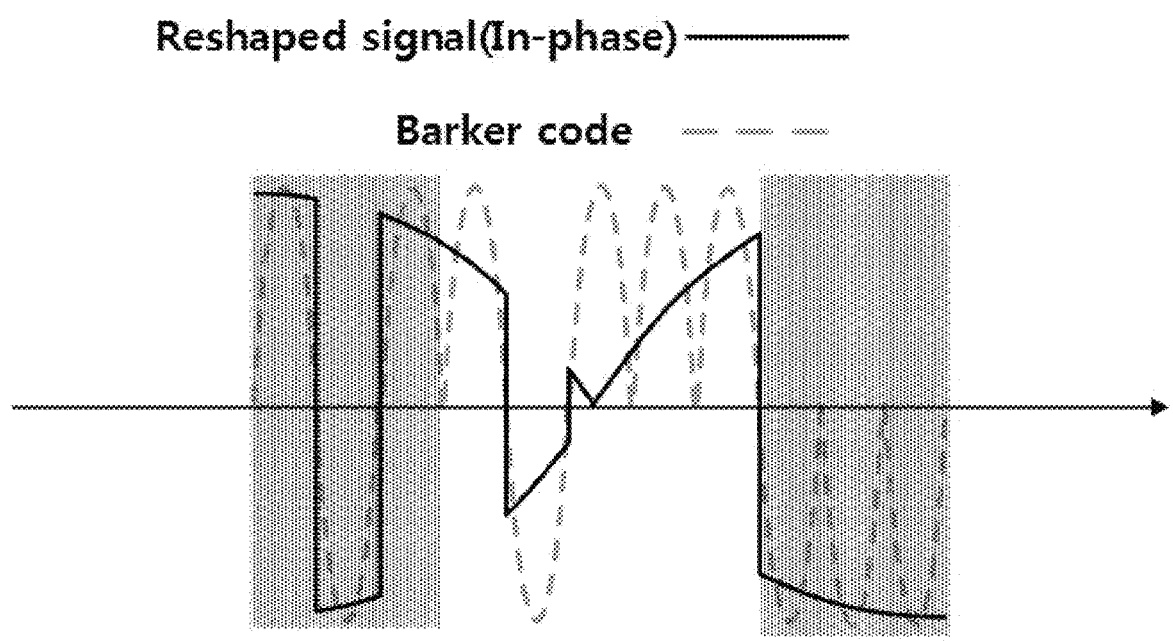

FIG. 5A is a diagram illustrating an in-phase component of a ZigBee signal, and in FIG. 5B, a signal indicated by a solid line is a signal reshaped using the exemplary tag signal of the modulation scheme conversion device 10 illustrated in FIG. 4B, and a signal indicated by a broken line is a Barker code. Referring to FIGS. 5A and 5B, a correlation operation value between the Barker code and the reshaped in-phase component is greater than a WiFi correlation threshold of 2/11 and may induce false synchronization with in-phase components.

To avoid this issue, the tag signal of the modulation scheme conversion device 10 is selected so that, when a correlation operation with quadrature components of the ZigBee signal is performed, the correlation operation value exceeds the threshold. When signal reshaping is completed in this way, the WiFi receiver is synchronized with quadrature components rather than in-phase components.

Since S is a set of tag signals of the modulation scheme conversion device 10 from which a correlation operation value of the threshold or more may be obtained, finding such a tag signal from S may be formulated as an optimization problem defined for a ZigBee half-sine signal with a duration of 1 μsec. I(t) and Q(t) are assumed to be in-phase and quadrature components of a ZigBee signal at a time t, respectively. When a target signal $Q(t_0)$ should be synchronized at a certain time point to, the problem is given by Equation 2 below.

[Equation 2]

$$\operatorname*{argmax}_{T \in S} Cor(Q(t_0) \cdot T), \quad (1)$$

$$\text{s.t. } Cor(Q(t_0 + \Delta t) \cdot T) < C_{th}, \forall \Delta t \in (0, 1 \text{ μs}], \quad (2)$$

$$Cor(I(t_0 + \Delta t) \cdot T) < C_{th}, \forall \Delta t \in [0, 1 \text{ μs}], \quad (3)$$

$X(t) \in \{Q(t), I(t)\}$, and $X(t) \cdot T$ is the product of $X(t)$ and the tag signal of the modulation scheme conversion device 10 for 1 μsec in the time domain and may represent that $X(t)$ is reshaped with the tag signal T of the modulation scheme conversion device 10. $Cor(X(t) \cdot T)$ is the correlation value between $X(t) \cdot T$ and the Barker code, and $C_{th}$ is a correlation threshold of the WiFi receiver.

The intuitive explanation of the optimization problem is to set the tag signal T to 0 so that the backscattering tag of the modulation scheme conversion device 10 does not reflect a signal but absorbs the energy for a part in which in-phase components have a high correlation with the Barker code, such as parts indicated by gray shadows in FIG. 5(b). Assuming that the corresponding tag signal is $T_{sel}$, $T_{sel}$ may be represented as $T_{sel}$=[0 0 0 1 −1 0 1 1 0 0 0].

The tag signal selected as described above is used for (i) maximizing the correlation with the quadrature signal $Q(t_0)$ at a time to $t_0$ be synchronized with the WiFi receiver (Equation 2, (1)), (ii) limiting the correlation value less than or equal to the threshold for an arbitrary time Δt which is not 0 (Equation 2, (2)), and (iii) always setting the correlation value with $I(t_0)$ to the threshold or less to prevent the WiFi receiver from being synchronized with an in-phase signal (Equation 2, (3)). The tag signal selected in this way is used in the modulation scheme conversion device 10 according to the present embodiment.

To assemble an 802.11b WiFi packet for synchronization with the WiFi receiver, the modulation scheme conversion device 10 should construct a valid WiFi header. Since both ZigBee and WiFi headers are known, construction of a WiFi header may only include a signal reshaping process for a fixed sequence.

Figure 6A:
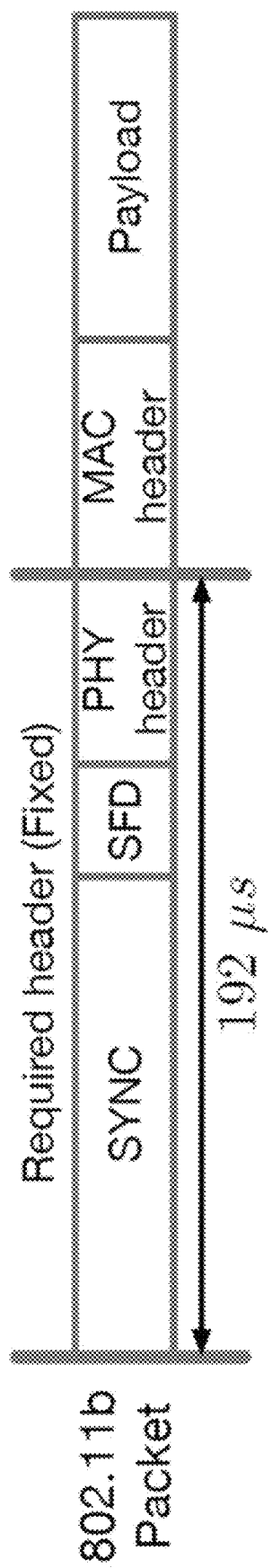
FIG. 6A is a diagram schematically illustrating a header structure of an 802.11b WiFi packet.
Figure 6B:
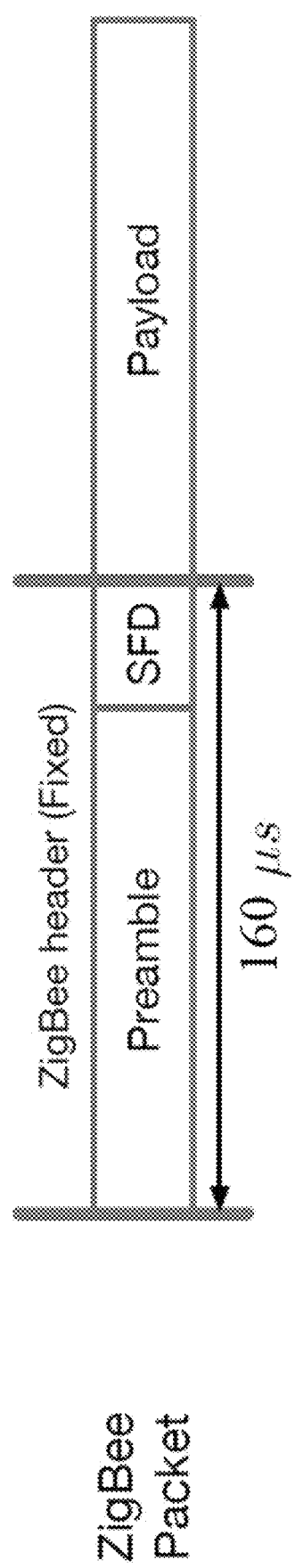
FIG. 6B is a diagram schematically illustrating a header structure of a ZigBee packet.

FIG. 6A is a diagram schematically illustrating a header structure of an 802.11b WiFi packet, and FIG. 6B is a diagram schematically illustrating a header structure of a ZigBee packet. Referring to FIGS. 6A and 6B, SYNC, SFD, and a PHY field are strictly required for a packet to be received, decoded, and passed to an application by the WiFi receiver. As an example, a PHY field may contain information on a modulation scheme and a packet length. When the 802.11b protocol is used, 1 Mbps DBPSK is used as a modulation scheme, and thus the corresponding value is determined. Also, the PHY field may be preset to receive 127 bytes which is the maximum length of ZigBee packets. The modulation scheme conversion device 10 assembles a header using the preamble and the SFD field of a predefined ZigBee header. Accordingly, the packet assembly process is a process of reshaping between a fixed ZigBee header and a preset WiFi header.

However, the duration of the ZigBee header is 160 μsec, which is shorter than 192 μsec, the duration of the WiFi header. This duration difference can be overcome by constructing a SYNC field of 96 μsec duration instead of an existing SYNC field of 128 μs duration. Even when the SYNC field of 96 μsec duration is inserted into the header, the impact is negligible. This is determined to result from the conservatively defined duration of the SYNC field.

Figure 7:
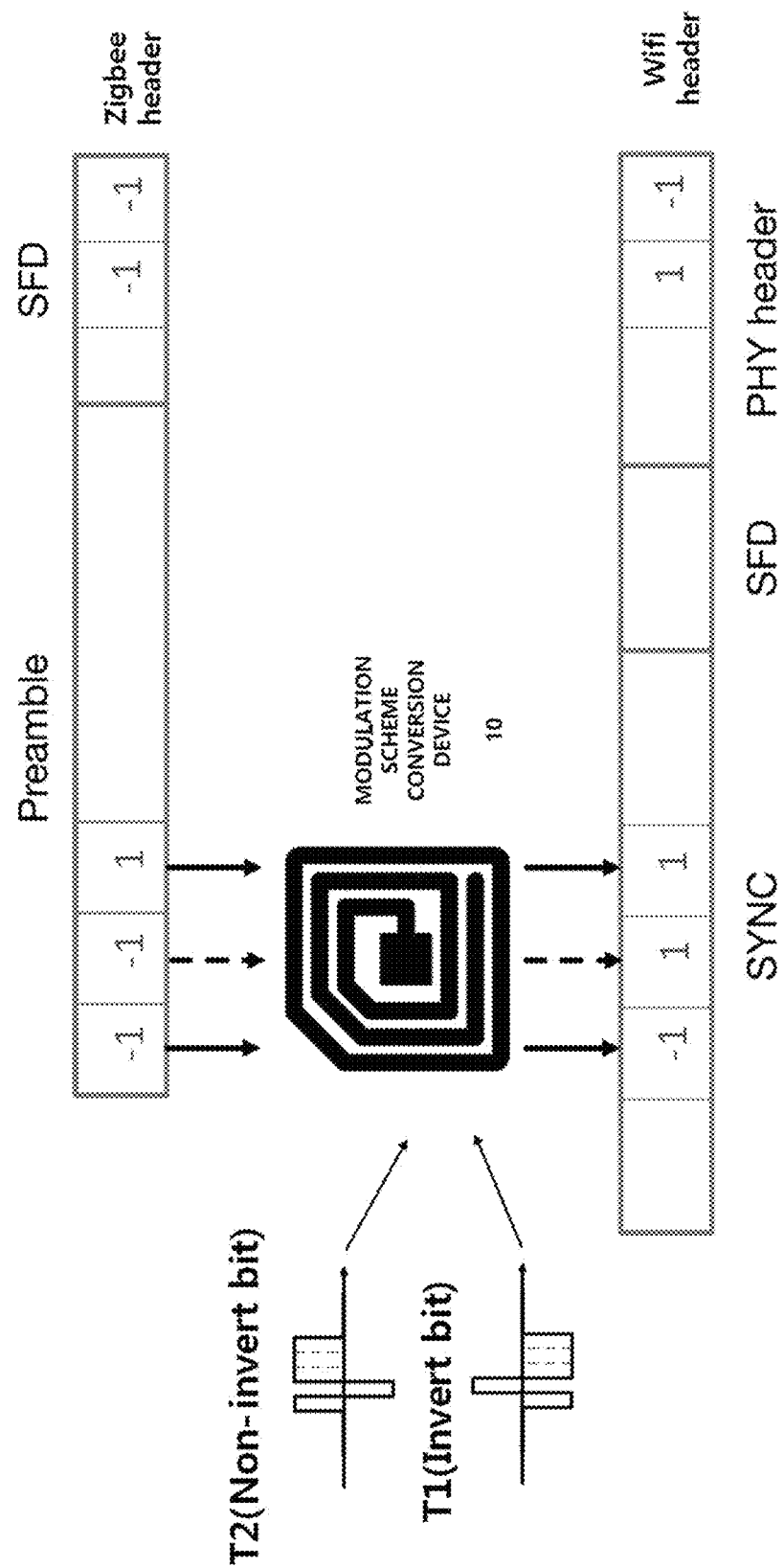
FIG. 7 is a diagram illustrating a process of converting a bit sequence of a ZigBee header into a bit sequence of a WiFi header.

FIG. 7 is a diagram illustrating a process of converting a bit sequence of a ZigBee header into a bit sequence of a WiFi header. Referring to FIG. 7, both the ZigBee header and the WiFi header have a determined bit sequence. Accordingly, mapping may be performed to convert bits included in the header of the ZigBee signal into a bit sequence of the WiFi header. For example, mapping may be performed by non-inverting or inverting the bits of the header of the ZigBee signal. In this way, the header of the predetermined ZigBee signal may be mapped to the preset WiFi header.

In the mapping process, the ZigBee header signal may be reshaped by providing an invert bit sequence T1 for inverting the bit sequence of the header of the ZigBee signal and/or a non-invert bit sequence T2 as the tag signal T provided to the modulation scheme conversion device 10.

For example, it is assumed that a bit sequence of −1, −1, and 1 included in the preamble of the ZigBee header is converted into a bit sequence of −1, 1, and 1 of the WiFi header. When the invert bit sequence T1 [0, 0, −1, 1, 0, −1, −1, 0, 0, 0] is provided to the modulation scheme conversion device 10 as a tag signal, the corresponding bits of the header of the ZigBee signal are inverted. Also, in the case of inverting a sign, that is, −1 of the ZigBee header to 1 of the WiFi header, the non-invert bit signal T2 [0, 0, 1, −1, 0, 1, 1, 0, 0, 0] is provided to the modulation scheme conversion device 10 as a tag signal, and then the corresponding bits of the header of the ZigBee signal are not inverted.

As described above, when an invert bit signal or a non-invert bit signal is provided to the modulation scheme conversion device 10 as a tag signal, it is possible to convert a header as well as a payload through a signal reshaping process. Accordingly, a ZigBee packet may be reshaped into a WiFi packet.

Figure 8:
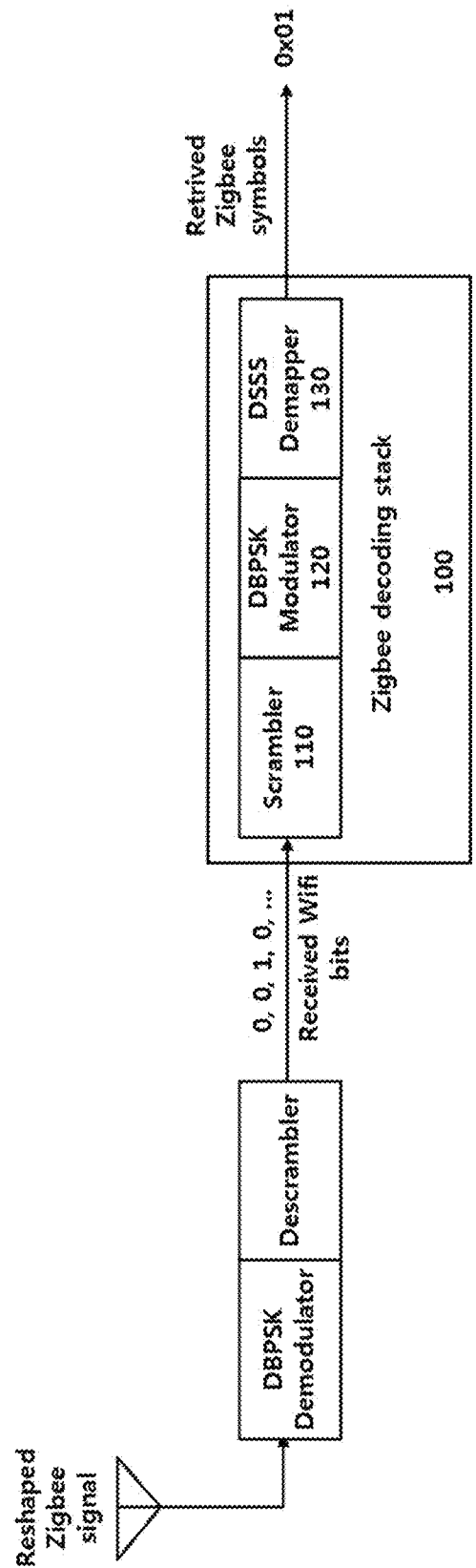
FIG. 8 is a diagram schematically showing a structure of a WiFi receiver for recovering ZigBee symbols from a reshaped signal.

FIG. 8 is a diagram schematically showing a structure of a WiFi receiver for recovering ZigBee symbols from a reshaped signal. Referring to FIG. 8, a WiFi packet reshaped from a ZigBee packet is compatible with a commercial WiFi device, and the packet is decoded as is. However, the original ZigBee symbols should be recovered from the received WiFi packet so that the modulation scheme conversion device operates as a gateway. The reshaped signal received by the WiFi receiver as described above passes through a DBPSK demodulator and a descrambler having a fixed scrambling seed as defined in the 802.11b WiFi standard, and the descrambler provides received WiFi bits.

Although the ZigBee symbols may be obtained by performing decoding through a ZigBee decoding stack 100, the reshaped signal is decoded in the WiFi receiver, and thus it is necessary to map descrambled WiFi bits to ZigBee symbols.

To recover chips based on quadrature components of the ZigBee signal, the WiFi bits output by the descrambler are processed by a scrambler 110 and a BPSK modulator 120. Since the scrambler and the descrambler have a fixed seed defined by the standard, the WiFi receiver can easily recover quadrature component chips transmitted by a ZigBee device.

The DBPSK modulator 120 modulates a signal provided by the scrambler 110 in the DBPSK modulation scheme and provides the modulated signal to the DSSS demapper 130. The DSSS demapper 130 searches quadrature component chips for ZigBee symbols and outputs the corresponding ZigBee symbols. ZigBee communicates using 16 different DSSS symbols including 16 quadrature and in-phase half-sine signals. While DSSS symbols include both quadrature and in-phase components, the symbols may also be uniquely identified with the quadrature components. Accordingly, it is possible to recover all information in the ZigBee packet through the modulation scheme conversion device 10 on a commercial WiFi device.

More specifically, for every 16 chips from the recovered quadrature component chips, the WiFi device computes the Hamming distance between the 16 chips and the quadrature components of DSSS symbols and outputs a symbol having the minimum Hamming distance. The output symbol is the same as a symbol sent by the ZigBee device unless link loss occurs. Therefore, a ZigBee symbol reshaped by the modulation scheme conversion device 10 may be recovered at the WiFi receiver.

Due to the different packet structures of ZigBee and WiFi, the reshaped ZigBee signal inevitably has a checksum (cyclic redundancy check (CRC)) error at the WiFi receiver. When the WiFi receiver is configured in a monitor mode which allows the corresponding packets to be received, it is possible to fix the checksum error. The applicability of the modulation scheme conversion device 10 of the present embodiment may be limited by a CRC deactivation request. However, many commercial WiFi devices can deactivate CRC by modifying software without modifying firmware or hardware, and thus the limitations to the application of the modulation scheme conversion device 10 of the present embodiment will likely not be so extensive.

Second Embodiment

Figure 9A:
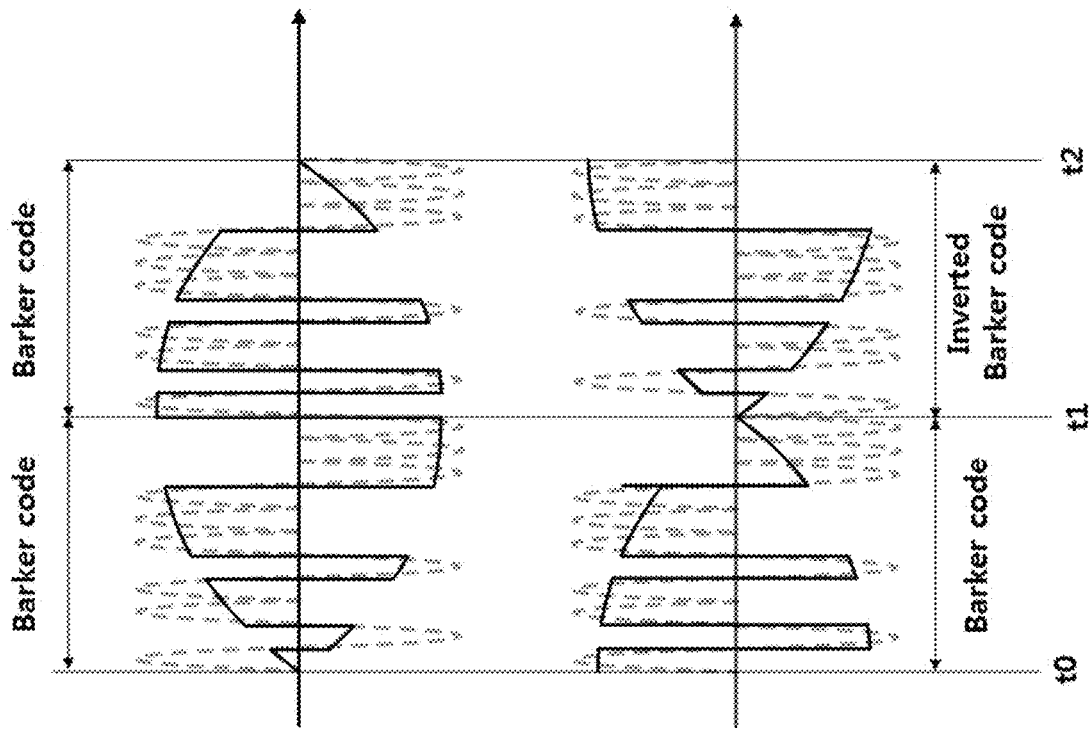
FIG. 9A shows a Bluetooth low energy (BLE) Gaussian frequency shift keying (GFSK) signal in the time domain.
Figure 9B:
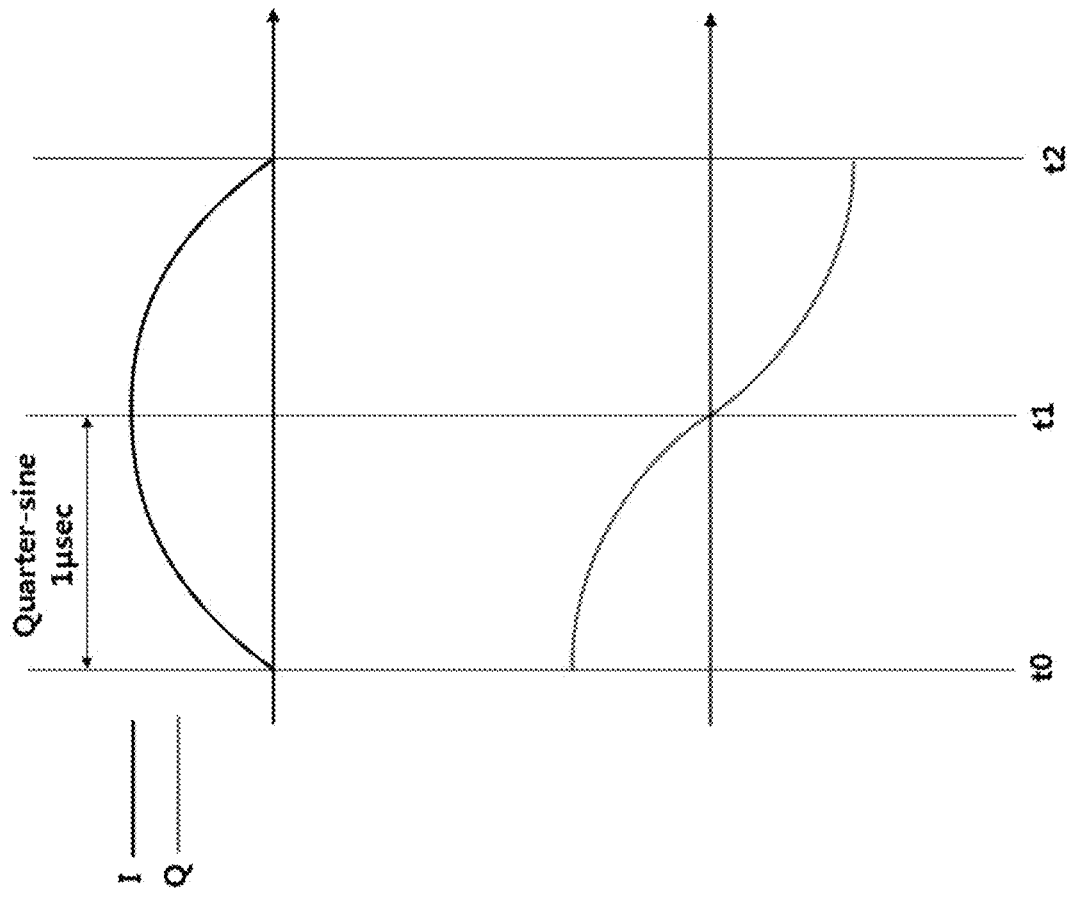
FIG. 9B shows an in-phase component reshaped by a modulation scheme conversion device according to the present embodiment in the upper part and shows a quadrature component reshaped by the modulation scheme conversion device in the lower part.

A second embodiment of the modulation scheme conversion device 10 will be described below with reference to FIGS. 9A and 9B. Description of elements which are identical or similar to those of the above-described embodiment may be omitted. As the second embodiment, a case in which a first modulation scheme signal is a BLE signal and a second modulation scheme signal is an 802.11b WiFi signal will be illustrated. FIG. 9A shows a BLE Gaussian frequency shift keying (GFSK) signal in the time domain. Referring to FIG. 9A, BLE modulates a signal in a GFSK modulation scheme. The GFSK modulation scheme in BLE modulates the signal by switching between two frequencies, and the phase is changed to correspond to the two frequencies.

The GFSK signal in BLE is shown with 1 MHz bandwidth, and bits of 1 and 0 are represented as phase offsets of $\pm\pi/2$ for every 1 μsec, corresponding to quarter-sine signals. A BLE signal is reshaped into a WiFi (802.11b) differential quadrature phase shift keying (DQPSK) signal by the modulation scheme conversion device 10.

A tag signal provided to the modulation scheme conversion device 10 may be identical to the tag signal provided to the modulation scheme conversion device 10 in the above-described first embodiment. However, unlike the first embodiment, both in-phase components and quadrature components of a BLE signal are used for constructing a WiFi DQPSK signal. This is because BLE does not use spreading code and both in-phase and quadrature components are required for recovering data transmitted in the BLE scheme. FIG. 9(b) shows in-phase components reshaped by the modulation scheme conversion device 10 on the upper side and shows quadrature components reshaped by the modulation scheme conversion device 10 on the lower side. A correlation operation is performed between the reshaped signals and a non-inverted Barker code or an inverted Barker code which is a WiFi keying signal.

FIG. 9A shows a phase shift of $-\pi/2$ in $t_1 \rightarrow t_2$, indicating a BLE bit of 0. This may be inferred from a pattern of non-inverted Barker codes and inverted Barker codes received by the WiFi receiver. In other words, when an in-phase signal has positive values between $t_0$ and $t_2$ as shown in the upper side of FIG. 9A, the in-phase signal is represented as two consecutive non-inverted Barker codes as shown in the upper side of FIG. 9B, and when a quadrature signal has positive values between $t_0$ and $t_1$ and has negative values between $t_1$ and $t_2$ as shown in the lower side of FIG. 9A, the quadrature signal is represented as a non-inverted Barker code and an inverted Barker code as shown in the lower side of FIG. 9B. There are 16 such combinations of inverted Barker codes and non-inverted Barker codes, each of which indicates a BLE bit of 1 or 0. Accordingly, the WiFi receiver can recover BLE data from a BLE packet.

A header of BLE packets having a duration of 56 μsec may be too short to construct a WiFi header having a duration of 192 μsec. When the first device 1 inserts a predetermined sequence to a payload and transmits the header, the modulation scheme conversion device 10 may convert the header into an intended WiFi header by multiplying the predetermined sequence by a tag signal, such as an invert bit sequence T1 (see FIG. 7) and/or a non-invert bit sequence T2.

Figure 10:
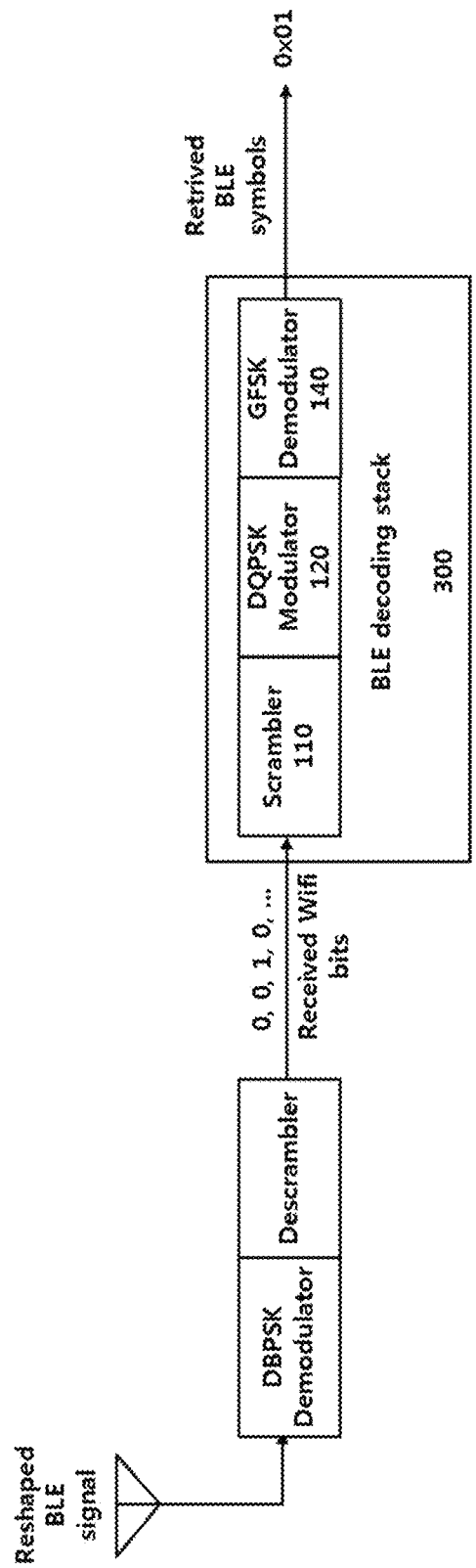
FIG. 10 is a diagram schematically showing a structure of a BLE decoding stack of a WiFi receiver that recovers BLE symbols from a reshaped signal.

FIG. 10 is a diagram schematically showing a structure of a BLE decoding stack of a WiFi receiver that recovers BLE symbols from a reshaped signal. Description of elements which are identical or similar to those of the above-described embodiments of the ZigBee decoding stack 100 (see FIG. 8) may be omitted. Referring to FIG. 10, a WiFi packet reshaped from a BLE packet is compatible with commercial WiFi devices and is decoded as is. However, in order for the modulation scheme conversion device to operate as a gateway, the original BLE symbols should be recovered from the received WiFi packet.

However, BLE is modulated with the GFSK scheme as described above, and thus a GFSK demodulator 140 may demodulate an output of a DQPSK modulator 120 to recover the original BLE symbols. Like the above-described embodiment, due to different packet structures of BLE and WiFi, the reshaped BLE signal inevitably has a checksum (CRC) error at the WiFi receiver. When the WiFi receiver is configured in a monitor mode which allows the corresponding packets to be received, it is possible to fix the checksum error. The applicability of the modulation scheme conversion device 10 of the present embodiment may be limited by a CRC deactivation request. However, many commercial WiFi devices can deactivate CRC by modifying software without modifying firmware or hardware, and thus the limitations to the application of the modulation scheme conversion device 10 of the present embodiment will likely not be so extensive.

Third Embodiment

A third embodiment of the modulation scheme conversion device 10 will be described below with reference to FIG. 11. Description of elements which are identical or similar to those of the above-described embodiments may be omitted. As the third embodiment, a case in which a first modulation scheme signal is a signal modulated by amplitude shift keying (ASK) and a second modulation scheme signal is a signal modulated by quadrature amplitude modulation (QAM) will be illustrated. For convenience of description, it is assumed that the first modulation scheme signal is a 4-ary ASK signal and the second modulation scheme signal is a 16QAM signal.

Figure 11A:
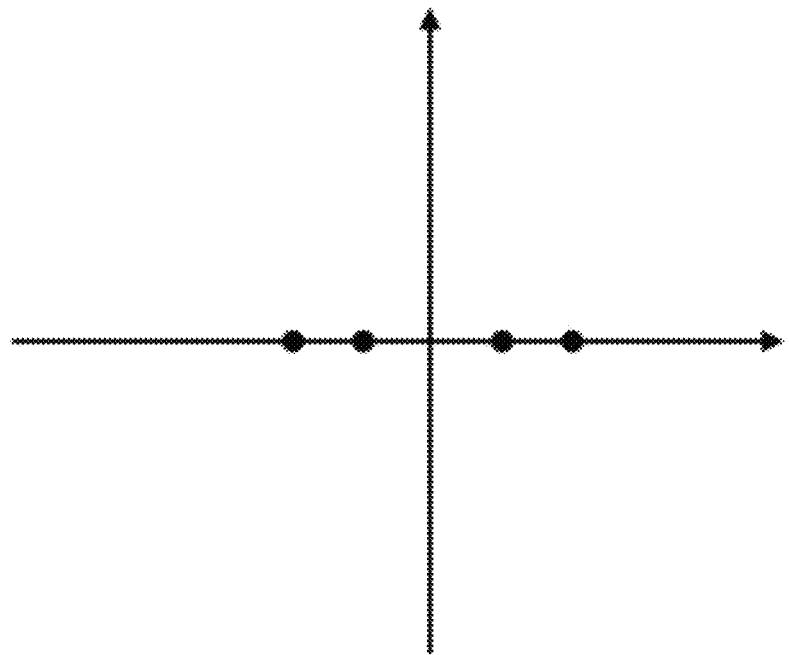
FIG. 11A is a diagram schematically showing the constellation of a 4-ary amplitude shift keying (ASK) signal.
Figure 11B:
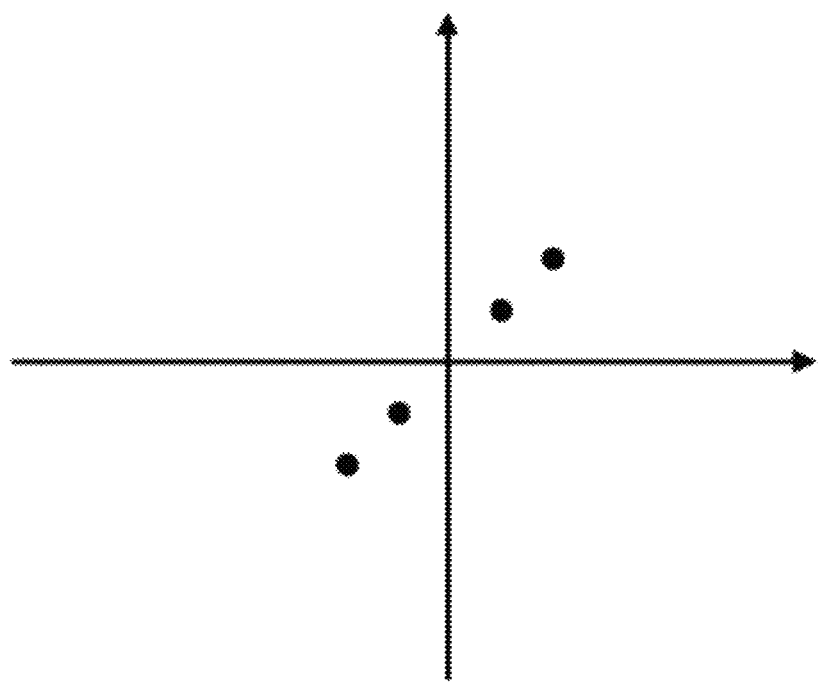
FIG. 11B is a diagram schematically showing the constellation of a 16-quadrature amplitude modulation (QAM) signal.

FIG. 11A is a diagram schematically showing the constellation of a 4-ary ASK signal, and FIG. 11B is a diagram schematically showing the constellation of a 16QAM signal. Referring to FIGS. 11A and 11B, a signal modulated with the 4-ary ASK modulation scheme is represented as four constellation points as shown in the drawing. As shown in Equation 1, when a phase is shifted by 45 degrees or 135 degrees using a tag signal, the phase of the first modulation scheme signal is shifted by 45 degrees or 135 degrees. In this way, the signal modulated with the 4-ary ASK modulation scheme may be reshaped into a QAM scheme signal as illustrated in FIG. 11B.

Implementation Example

Figure 12:
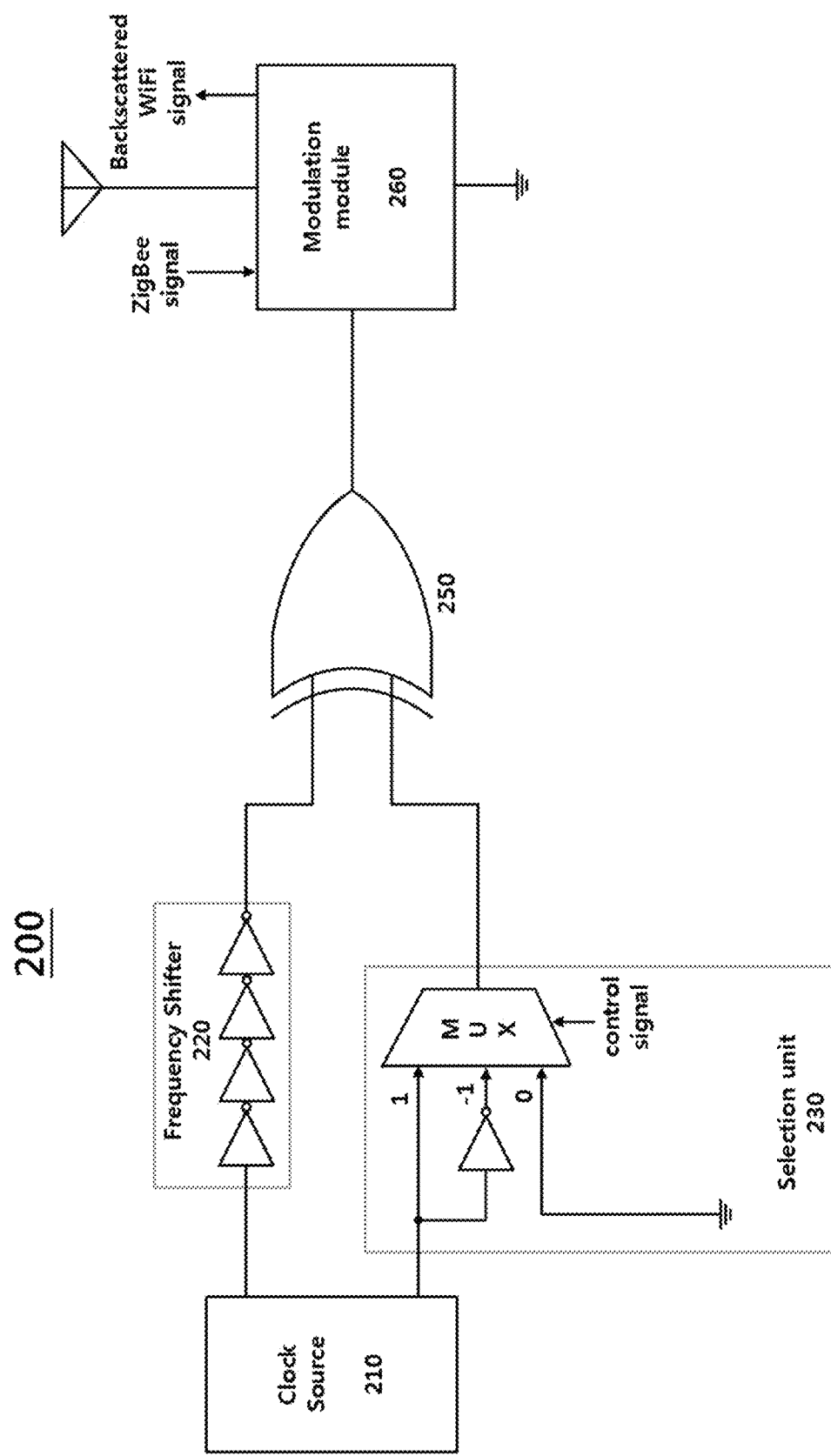
FIG. 12 is a schematic circuit diagram of the modulation scheme conversion device according to the present embodiment.

FIG. 12 schematically shows a circuit of a tag signal generation unit 200 that converts the ZigBee signal of the OQPSK modulation scheme illustrated in the first embodiment 1 into a WiFi signal of the DBPSK modulation scheme. Referring to FIG. 12, a clock source 210 provides a clock to an entire system including a frequency shifter and a tag signal modulator. As an embodiment, the clock source 210 may include a low-power ring oscillator. The frequency shifter 220 may be formed by connecting a plurality of buffers or a plurality of inverters, and due to the frequency shifter 220, the clock signal is delayed by 0.5 μsec which corresponds to the duration of a half chip. Accordingly, a quadrature component signal is connected to an XOR gate through the frequency shifter 220.

To implement a tag signal provided to a modulation scheme conversion device, three operations of $1(e^{j0})$, $-1(e^{j\pi})$, and 0 are required. A selection unit 230 may implement a phase offset of $\pi$ with delay at the "−1" path. The absorption of an RF signal denoted by "0" may be implemented by matching the impedance of an antenna such that the RF signal is absorbed into the ground.

As an embodiment, when the first modulation scheme signal is a BLE signal, a backscattering tag included in the modulation scheme conversion device does not need to absorb energy. Also, since both in-phase components and quadrature components are required, the "0" path connected to the ground potential is unnecessary in FIG. 12.

In the implementation example illustrated in FIG. 12, a field-programmable gate array (FPGA) is used for controlling a multiplexer (MUX) so that the tag signal modulator outputs an optimal tag signal $T_{sel}$. The clock delayed for a frequency shift and the tag signal are multiplied through the XOR gate 250 and then provided to an RF switch 260 such that the RF signal is backscattered or absorbed.

Generally, WiFi devices use channels 1, 6, and 11 to avoid overlaps. Accordingly, the modulation scheme conversion device 10 shifts the frequency of a backscattered signal to WiFi channel 4 or 8 to avoid self-interference by IoT signals and avoid interference with WiFi. In this way, the modulation scheme conversion device 10 and WiFi networks can coexist.

Also, when the modulation scheme conversion device 10 backscatters a signal while shifting the frequency, for example, when the frequency is shifted by fc by multiplying sin(ft) by sin(2πfct), not only (f+fc) frequency components but also (f−fc) frequency components are generated, which may cause inefficiency. However, single sideband backscatter is performed such that the unintended (f−fc) components remove frequency components. Accordingly, communication on unintended frequencies is not disturbed.

Evaluation

Figure 13:
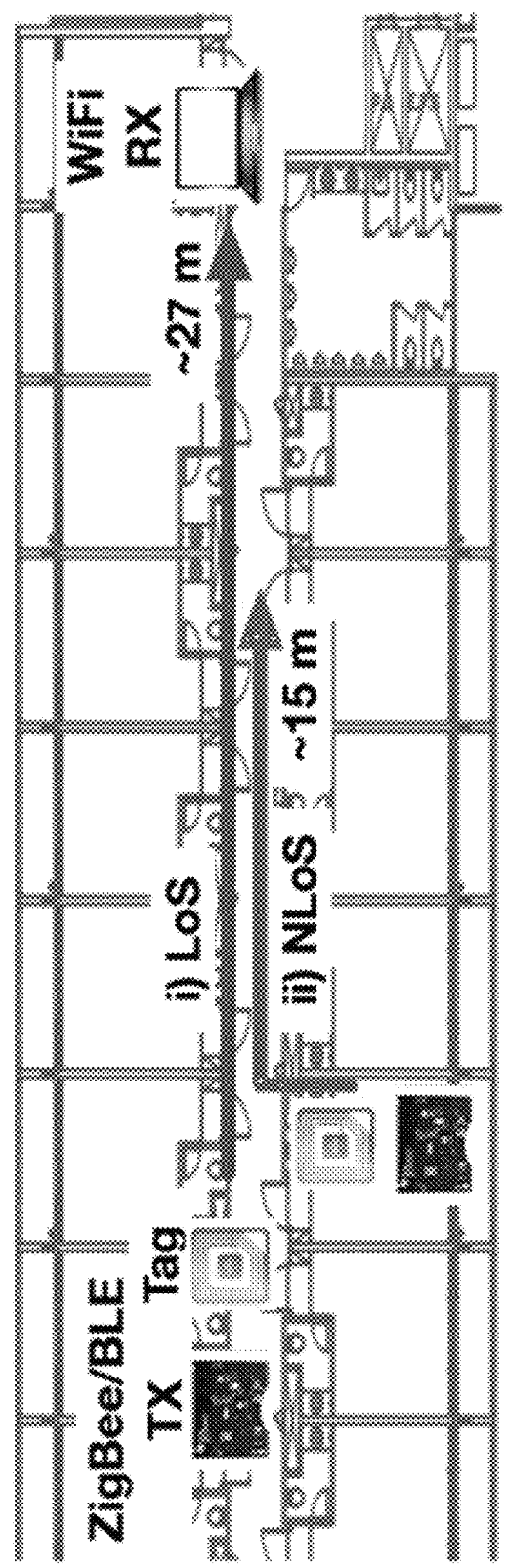
FIG. 13 is a diagram showing an environment for testing a transmitter (TX), a receiver (RX), and the modulation scheme conversion device in two environments of line-of-sight (LoS) and non-line-of-sight (NLoS).

FIG. 13 is a diagram showing an environment for testing a transmitter TX, a receiver RX, and the modulation scheme conversion device 10 in two environments of line-of-sight (LoS) and non-line-of-sight (NLoS). The transmitter TX includes a commercial IoT device, which transmits signals according to the ZigBee or BLE protocol and is released by various providers, and a low-power CC2650 RF chip complying with multiple standards. The transmission power of the low-power CC2650 chip was up to 5 dBm and was set to 5 dBm and 0 dBm in this evaluation.

To receive 802.11b packets at the receiver RX, a MacBook Pro laptop equipped with a Broadcom BCM WiFi chipset was used. The commercial WiFi chipset supports 802.11 a/b/g/n/ac such that 802.11b packets reshaped by the modulation scheme conversion device 10 can be received. In addition, the laptop was configured in the monitor mode to receive packets with CRC errors.

Throughput was measured by dividing the number of correctly received bits by the number of bits transmitted per second, and a bit error rate (BER) was calculated as correctly received bits by dividing the number of bits successfully detected at the WiFi receiver by the number of transmitted bits.

To verify whether the modulation scheme conversion device 10 according to the present embodiment worked as a gateway, the modulation scheme conversion device 10 was evaluated on IoT devices from various vendors, such as Samsung, Amazon, Philips, IKEA, and Xiaomi. The selected IoT devices were five smart home devices which had proprietary upper layer protocols of the vendors and were ZigBee compliant. To prove that the modulation scheme conversion device 10 can convert ZigBee packets sent by the IoT devices into WiFi packets, the laptop for capturing the reshaped WiFi packets and a universal software radio peripheral (USRP) device with 802.15.4 PHY for sniffing the ZigBee packets were deployed.

TABLE 1

| | Smart Things Sensor | Echo Plus | Hue Smart bulb | IKEA Smart bulb | Mijia Sensor |
|---|---|---|---|---|---|
| BER ($10^{-3}$) | 1.59 | 1.49 | 2.58 | 4.89 | 7.56 |
| RSSI (dBm) | −74 | −68 | −80 | −78 | −80 |

Table 1 shows BER and received signal strength indicator (RSSI) evaluation results of the smart home devices. The BER performance was measured by comparing the reshaped WiFi packets received by the laptop and the original ZigBee packets sniffed by the USRP device. RSSI was captured by the WiFi laptop. The evaluation results show that even though the devices may have different upper layer protocols, the modulation scheme conversion device 10 is compatible with the IoT devices and recovered the original ZigBee payloads. Accordingly, the modulation scheme conversion device 10 according to the present embodiment can operate as a gateway.

More specifically, when the IoT device transmitted a ZigBee packet containing ZigBee data, such as a temperature, an operation detection, or a state report, the modulation scheme conversion device 10 converted the packet into a WiFi packet, and thus the WiFi laptop received the WiFi packet and read the original ZigBee data from the packet.

Also, the BER and RSSI results achieved due to the robustness of 802.11b are enough to support many IoT application programs.

Figure 14A:
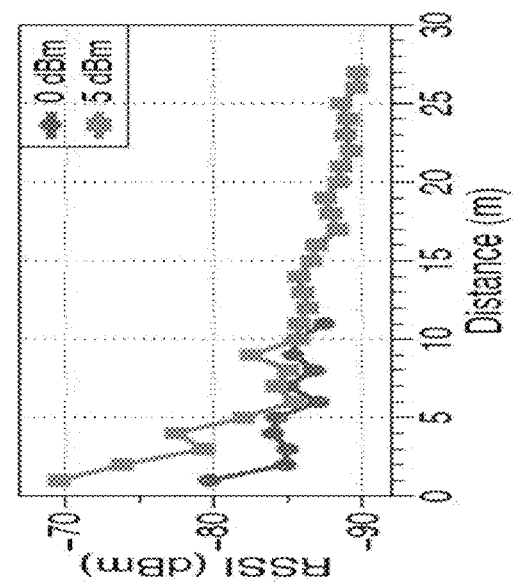
FIG. 14A is a diagram showing throughput performance evaluation results of a modulation scheme conversion device (10) in a ZigBee-to-WiFi LoS scenario.
Figure 14B:
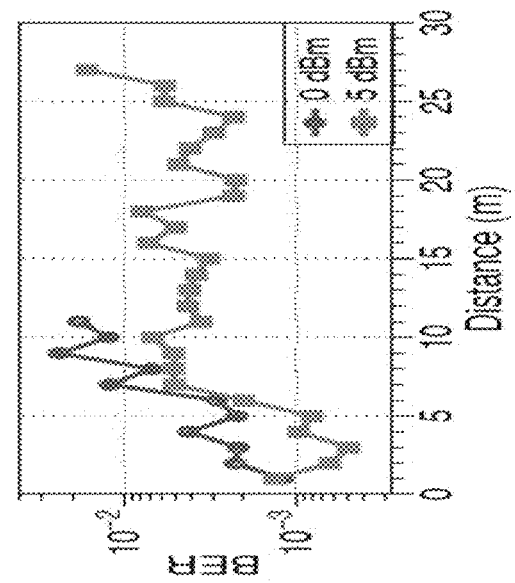
FIG. 14B is a diagram showing bit error rate (BER) performance evaluation results of the modulation scheme conversion device
Figure 14C:
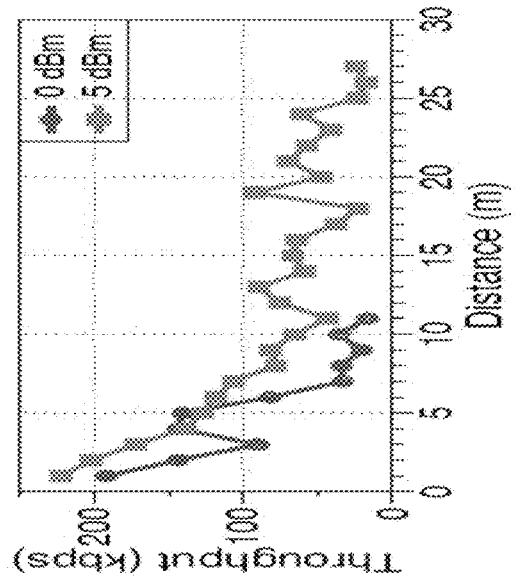
FIG. 14C is a diagram showing received signal strength indicator (RSSI) performance evaluation results of the modulation scheme conversion device in the ZigBee-to-WiFi LoS scenario.

FIG. 14A is a diagram showing throughput performance evaluation results of the modulation scheme conversion device 10 in a ZigBee-to-WiFi LoS scenario, FIG. 14B is a diagram showing BER performance evaluation results of the modulation scheme conversion device 10 in the ZigBee-to-WiFi LoS scenario, and FIG. 14C is a diagram showing RSSI performance evaluation results of the modulation scheme conversion device 10 in the ZigBee-to-WiFi LoS scenario.

While the distance between the TX and the modulation scheme conversion device 10 was fixed at 50 cm and the distance between the modulation scheme conversion device 10 and the RX was increased, throughput, BER, and RSSI were measured. As shown in FIG. 14A, throughput results achieved at the closest distance of 1 m are 222 kbps and 192 kbps at TX powers of 5 dBm and 0 dBm, respectively, which are very close to 250 kbps, the maximum throughput of ZigBee. As shown in FIG. 14C, as the distance increases, the throughput performance degrades due to degraded RSSI performance.

A maximum communication distance of 27 m is achieved with the TX power of 5 dBm, and a communication distance of 11 m is achieved with the TX power of 0 dBm. BER results are degraded at longer distances from $10^{-4}$ to $10^{-1}$ as shown in FIG. 14B.

Figures 15A, 15B, 15C:
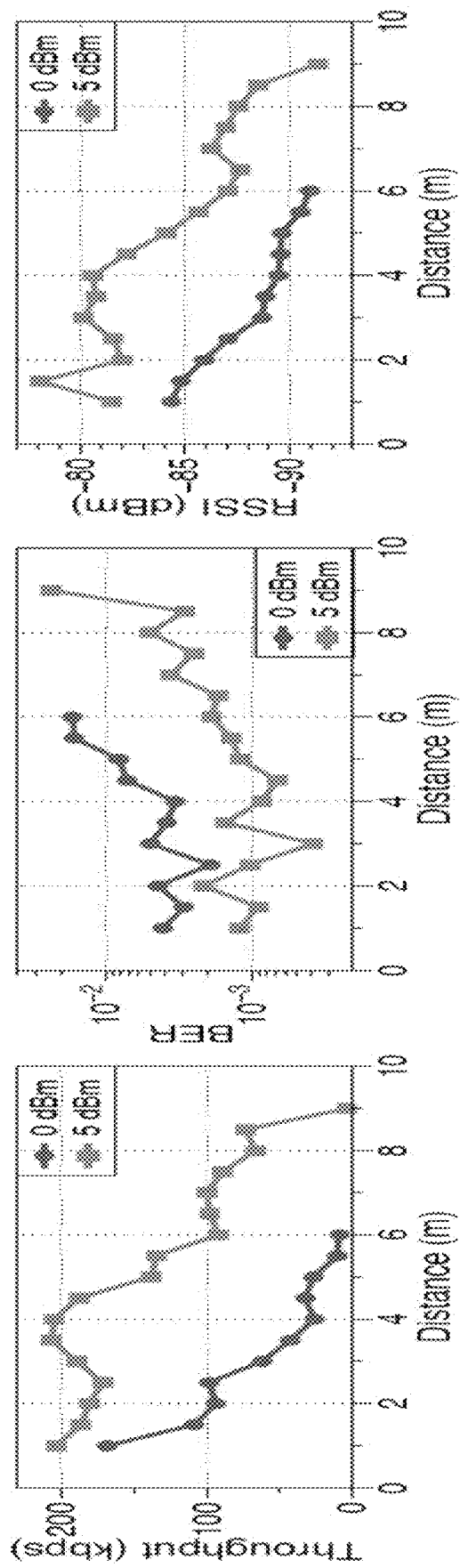
FIG. 15A is a diagram showing throughput performance evaluation results of the modulation scheme conversion device (10) in a ZigBee-to-WiFi NLoS scenario.
FIG. 15B is a diagram showing BER performance evaluation results of the modulation scheme conversion device (10) in the ZigBee-to-WiFi NLoS scenario.
FIG. 15C is a diagram showing RSSI performance evaluation results of the modulation scheme conversion device in the ZigBee-to-WiFi NLoS scenario.

FIG. 15A is a diagram showing throughput performance evaluation results of the modulation scheme conversion device 10 in a ZigBee-to-WiFi NLoS scenario, FIG. 15B is a diagram showing BER performance evaluation results of the modulation scheme conversion device 10 in the ZigBee-to-WiFi NLoS scenario, and FIG. 15C is a diagram showing RSSI performance evaluation results of the modulation scheme conversion device 10 in the ZigBee-to-WiFi NLoS scenario.

In the test environment of FIGS. 15A to 15C, the TX and the modulation scheme conversion device 10 were located indoors, and the RX moved along an aisle. Referring to FIG. 15A, when the RX was close to the modulation scheme conversion device 10, the achieved throughput performance (203 kbps and 163 kbps at 5 dBm and 0 dBm, respectively) was similar to the results of the LoS scenario even though the received signal was weaker than the signal of the LoS scenario. However, when the distance increased, the throughput and BER performance dropped rapidly. Accordingly, the communication distances were up to 9 m and 6 m at TX powers of 5 dBm and 0 dBm, respectively, as shown in FIGS. 15A and 15C.

In the NLoS scenario, the modulation scheme conversion device 10 should perform retransmission several times due to high BER, which consumes additional energy. In the same experimental environment, to process retransmission without restarting from the beginning, the modulation scheme conversion device is set to have a dwell time after finishing backscatter. With the presence of an obstacle between the modulation scheme conversion device 10 and the RX, the communication distance became shorter, but the modulation scheme conversion device can achieve reasonable communication ranges in various application fields (e.g., home IoT and near-field communication (NFC)).

Figure 16C:
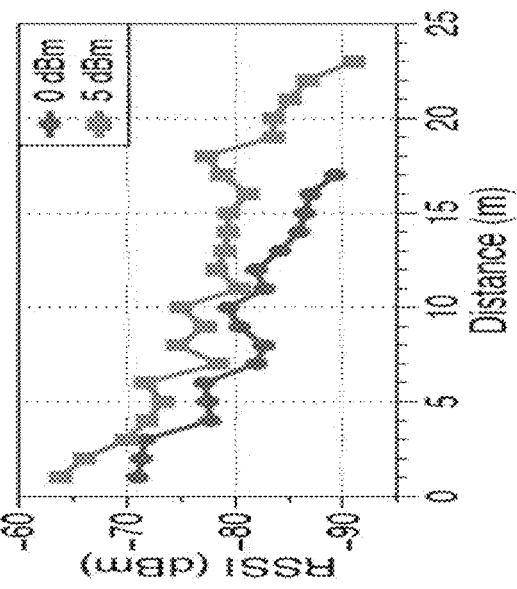
FIG. 16C is a diagram showing RSSI performance evaluation results of the modulation scheme conversion device in the BLE-to-WiFi LoS scenario.
Figure 16B:
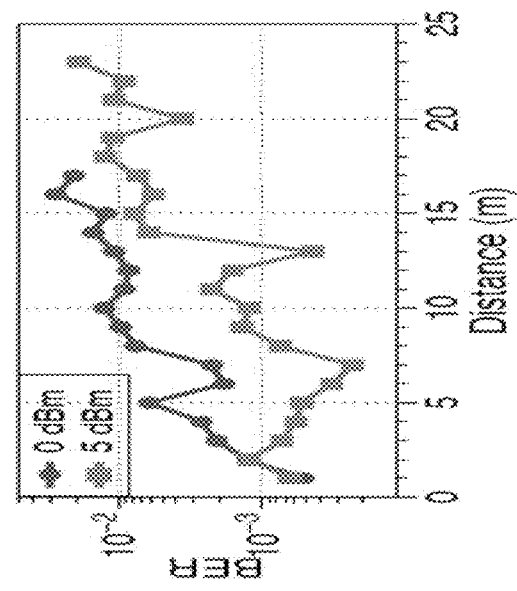
FIG. 16b is a diagram showing BER performance evaluation results of the modulation scheme conversion device (10) in the BLE-to-WiFi LoS scenario.
Figure 16A:
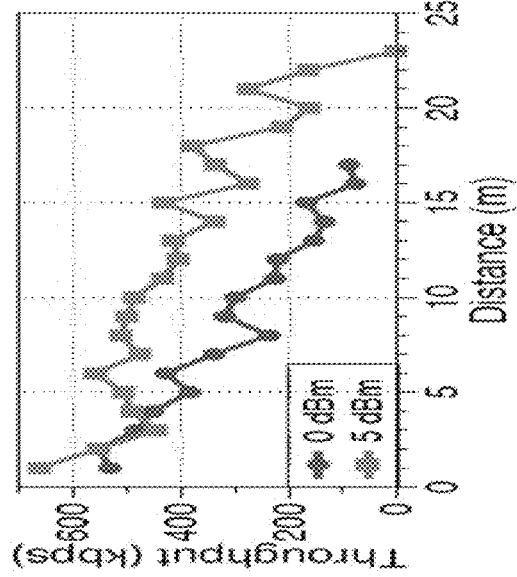
FIG. 16A is a diagram showing throughput performance evaluation results of the modulation scheme conversion device (10) in a BLE-to-WiFi LoS scenario.

FIG. 16A is a diagram showing throughput performance evaluation results of the modulation scheme conversion device 10 in a BLE-to-WiFi LoS scenario, FIG. 16B is a diagram showing BER performance evaluation results of the modulation scheme conversion device 10 in the BLE-to- WiFi LoS scenario, and FIG. 16C is a diagram showing RSSI performance evaluation results of the modulation scheme conversion device 10 in the BLE-to-WiFi LoS scenario.

In the same experimental environment as the ZigBee to WiFi evaluation for the LoS scenario, BLE-to-WiFi performance was evaluated. As shown in FIG. 16A, the modulation scheme conversion device 10 obtained throughputs of 662 kbps and 531 kbps at powers of 5 dBm and 0 dBm, respectively. Since the maximum throughput of BLE is 1 Mbps, the achieved throughputs are higher than those of the ZigBee-to-WiFi communication. On the other hand, since there is no coding in a BLE signal, the BLE signal shows high BER as shown in FIG. 16B, but a large portion of bit errors in the ZigBee-to-WiFi communication can be recovered due to DSSS coding of a ZigBee signal.

Referring to FIG. 16C, it is worth noting that the RSSI of the BLE-to-WiFi communication is higher than that of the ZigBee-to-WiFi communication. This is because the modulation scheme conversion device 10 uses the whole BLE signal to generate the WiFi signal while only half of the ZigBee signal is backscattered to generate the WiFi signal. Due to the characteristics of the WiFi receiver which uses the correlation to decode the signal, the available communication ranges are very similar in both cases.

Figure 17A:
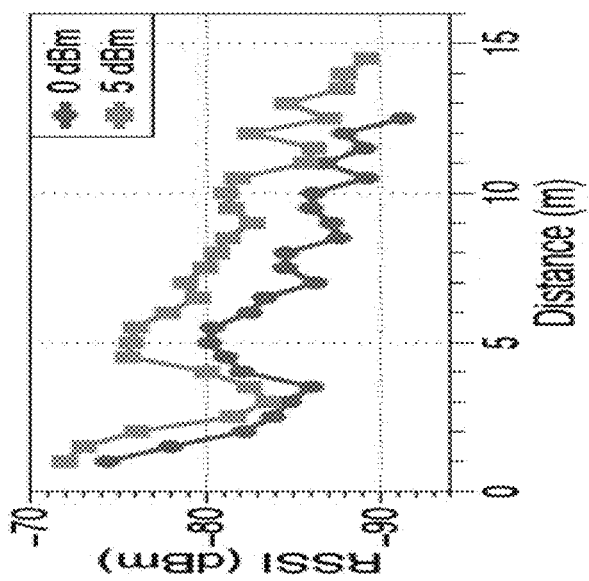
FIG. 17A is a diagram showing throughput performance evaluation results in a BLE-to-WiFi NLoS scenario.
Figure 17B:
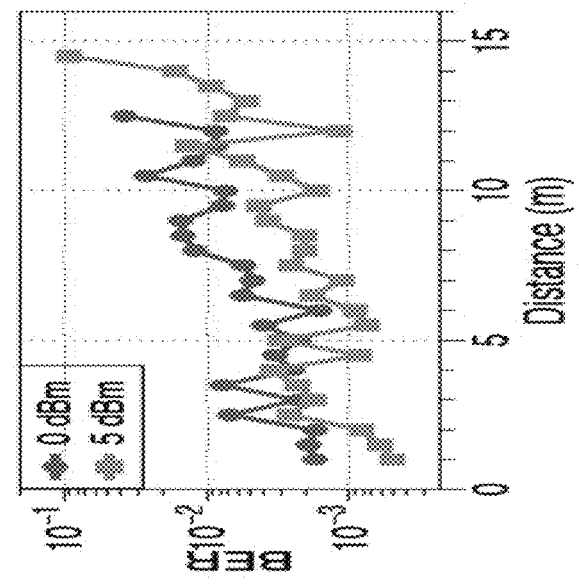
FIG. 17B is a diagram showing BER performance evaluation results in the BLE-to-WiFi NLoS scenario.
Figure 17C:
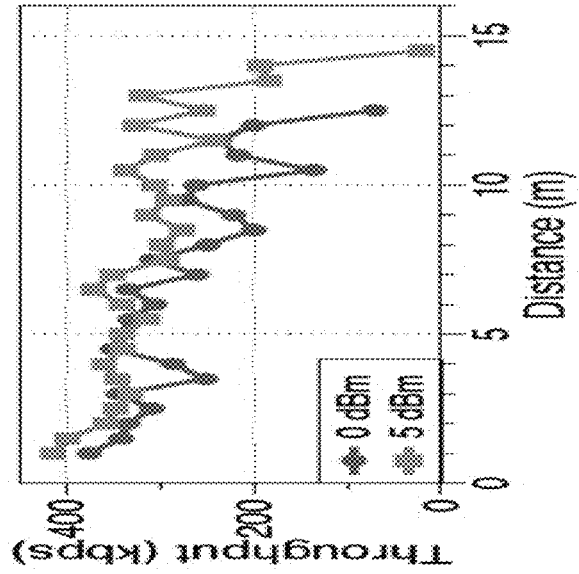
FIG. 17C is a diagram showing RSSI performance evaluation results in the BLE-to-WiFi NLoS scenario.

FIG. 17A is a diagram showing throughput performance evaluation results in a BLE-to-WiFi NLoS scenario, FIG. 17B is a diagram showing BER performance evaluation results in the BLE-to-WiFi NLoS scenario, and FIG. 17C is a diagram showing RSSI performance evaluation results in the BLE-to-WiFi NLoS scenario. In terms of throughput, BER, and RSSI, all performance is degraded compared to that of the LoS scenario. However, referring to FIG. 17A, although there is an obstacle between the modulation scheme conversion device 10 and the RX, the throughput is achieved up to 415 kbps and 377 kbps when the TX sends 5 dBm and 0 dBm signals, respectively. The maximum communication ranges that can be achieved by the modulation scheme conversion device 10 are 14.5 m (5 dBm) and 12.5 m (0 dBm).

The performance of BER and RSSI is shown in FIGS. 17B and 17C, which show the same tendency as the previous results. To minimize energy cost in an unreliable environment, such as the ZigBee-to-WiFi NLoS scenario, the dwell time may be applied to BLE to WiFi. For low-power IoT devices, the achieved communication ranges which are longer than 10 m are suitable for many applications that require short-range communication.

FIG. 18 is a diagram showing the impact of varying the distance between a TX and the modulation scheme conversion device 10 in a ZigBee-to-WiFi experimental environment. Referring to FIG. 18, since the performance of backscatter communication of the modulation scheme conversion device 10 also depends on the distance between the TX and the modulation scheme conversion device 10, the impact of varying the distance between the TX and the modulation scheme conversion device 10 from 1 m to 4 m was evaluated for the ZigBee-to-WiFi communication.

As shown in FIG. 18, throughput performance depends not only on the distance between the RX and the modulation scheme conversion device 10 but also on the distance between the TX and the modulation scheme conversion device 10. At the shortest distances (i.e., 1 m for both), the modulation scheme conversion device 10 achieves about 175 kbps throughput, but the performance degrades with an increase in the distance. When the distance between the TX and the modulation scheme conversion device 10 is 4 m, the maximum of 100 kbps can be achieved. Therefore, the TX-tag distance does not significantly limit the deployment of the modulation scheme conversion device.

TABLE 2

|  | Oscillator | Modulator | Net power |
|---|---|---|---|
| Power consumption | 9.7 μW | 29 μW | 38.7 μW |

Table 2 is a table showing power consumption of the modulation scheme conversion device. The ring oscillator-based clock source (Oscillator in Table 2, see 210 in FIG. 12), which provides the clock to the frequency shifter and the other circuitry, consumes 9.7 μW. The main modulation module (see 260 in FIG. 12) of the modulation scheme conversion device including the RF switch (Modulator in Table 2) consumes 29 μW (measured using a power analysis tool provided by the FPGA vendor). The power analysis tool can estimate the amount of power consumed when the FPGA is implemented as an integrated circuit. From this, the net power consumption of the modulation scheme conversion device 10 implemented in an application-specific integrated circuit (ASIC) is estimated to be 38.7 μW. Since energy harvesting devices can produce, for example, more than 100 μW from indoor lights and the like, the modulation scheme conversion device 10 can operate as a backscatter gateway without a battery or operate for a long time with power provided by a coin cell (1000 mAh). When the modulation scheme conversion device 10 is implemented in an ASIC, the main difference from the prototype is in that a customized antenna is necessary, and the customized antenna can provide similar performance.

FIG. 19 is a set of diagrams showing the impact of backscattering of the modulation scheme conversion device 10 on an existing WiFi network and the impact of an existing WiFi network on backscattering of the modulation scheme conversion device 10. One laptop repeatedly transmitted 802.11b (1 Mbps) packets or 802.11n (65 Mbps) packets on WiFi channel 6 (2.437 GHz), and another laptop which was 1 m away from the transmitter received the WiFi packets and measured throughput. When a CC2650 transmitter sent a ZigBee signal, the modulation scheme conversion device 10 backscattered the ZigBee signal. The modulation scheme conversion device 10 was located 1 m away from the receiver laptop.

The modulation scheme conversion device 10 shifts a signal reshaped from a ZigBee signal to WiFi channel 4 (2.427 GHz) or channel 8 (2.447 GHz) to reduce interference with a WiFi network which uses WiFi channel 1, 6, or 11. The throughputs of 802.11b and 802.11n were measured when the modulation scheme conversion device 10 did not backscatter (Tag Off), backscattered in WiFi channel 4 (Tag On Ch. 4), or backscattered in WiFi channel 6 (Tag On Ch. 6). The results are shown in FIGS. 19A and 19B.

As shown in the results, when the modulation scheme conversion device 10 did not backscatter, the throughputs of both 802.11b and 802.11n were high. When the modulation scheme conversion device backscatters and thus there is interference, WiFi throughput, in particular, the performance of Ch. 6, decreases, but the throughput is still high because the power of the backscattered signal is relatively small. In other words, while strong WiFi signals can be successfully decoded due to capture effects, weak backscattered signals of the modulation scheme conversion device are naturally controlled.

Figure 20A:
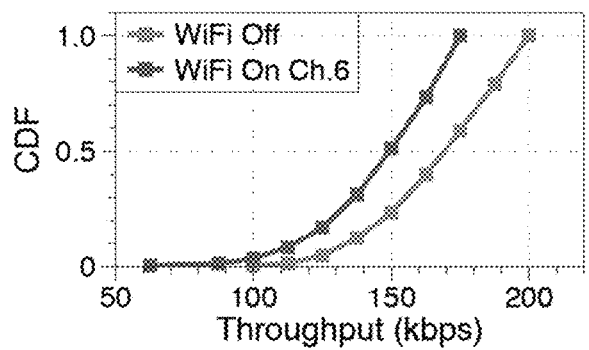
FIGS. 20A and 20B show throughput performance of the modulation scheme conversion device when there is no WiFi signal or an 802.11.11b or 802.11n signal is transmitted on channel 6.
Figure 20B:
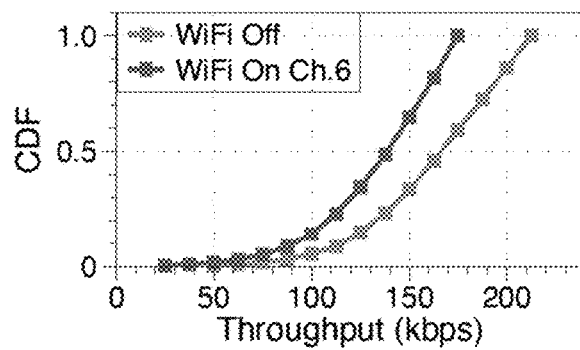

FIGS. 20A and 20B show throughput performance of the modulation scheme conversion device when there is no WiFi signal or an 802.11.11b or 802.11n signal is transmitted on channel 6. Since a signal backscattered by the modulation scheme conversion device is weaker than a WiFi signal, performance loss is inevitable when there is an ongoing WiFi signal in an adjacent channel. However, the robustness of 802.11b allows the WiFi receiver to receive the reshaped and backscattered signal on WiFi channel 4 despite interference on WiFi channel 6 (WiFi On Ch. 6).

Further, FIG. 20B shows that less interference occurs because 802.11n performs orthogonal frequency division multiplexing (OFDM) modulation and shows that 802.11n has better throughput performance than 802.11b because 802.11n occupies a smaller bandwidth. Therefore, when a reshaped signal is backscattered in channel 4 and channel 8, it is possible to reduce impact on the existing WiFi network and the backscattered signal.

The modulation scheme conversion device 10 may be applied to several devices on the basis of carrier-sense multiple access (CSMA) for avoiding collision. In other words, assuming that several IoT devices and a modulation scheme conversion device are distributed in a specific area, the IoT devices transmit signals one at a time due to carrier sensing such that collisions between the IoT devices are naturally minimized. Therefore, unless an error occurs in CSMA, the modulation scheme conversion device operates without collision.

When multiple modulation scheme conversion devices 10 are deployed, throughput and communication range performance are improved. It is assumed that several tags are deployed to construct a pervasive IoT gateway. To verify a performance improvement that can be obtained by deploying multiple modulation scheme conversion devices, an environment identical to the ZigBee-to-WiFi LoS environment was configured. One to three modulation scheme conversion devices were deployed, and the TX transmitted a signal with the power of 0 dBm.

Figure 21A:
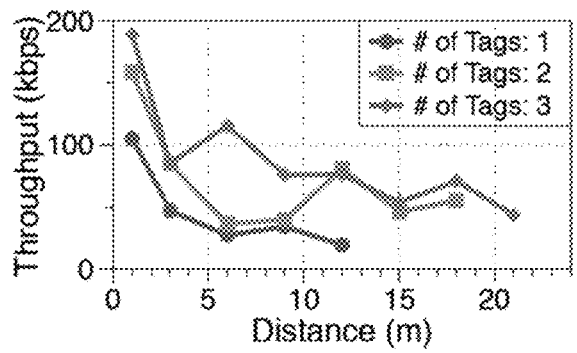
FIGS. 21A and 21B show performance in terms of throughput and RSSI when multiple modulation scheme conversion devices are deployed.
Figure 21B:
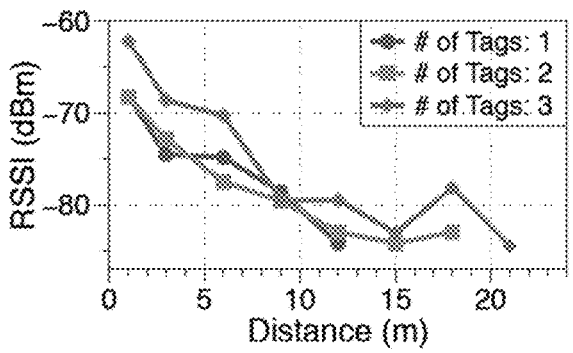

FIGS. 21A and 21B performance in terms of throughput and RSSI when multiple modulation scheme conversion devices are deployed. Referring to FIGS. 21A and 21B, as the number of deployed modulation scheme conversion devices increases, throughput and communication distance are increased up to 189 kbps and 21 m, respectively. The more devices are deployed, the better RSSI can be obtained due to the backscattered power from the multiple devices. This result indicates that whenever an IoT device transmits a packet, some modulation scheme conversion devices deployed near the IoT device can start backscattering to convert the IoT packet into a WiFi packet. From this result, it is possible to know that modulation scheme conversion devices may help to improve the performance even in multipath fading.

Although the present invention has been described with reference to the embodiments shown in the drawings to help understanding the present invention, the embodiments are for implementation and are merely exemplary. Those of ordinary skill in the art should appreciate that various modifications and other equivalent embodiments can be made from the embodiments. Therefore, the technical scope of the present invention should be determined by the accompanying claims.

The invention claimed is:

1. A modulation scheme conversion device comprising:
a backscattering tag to which a tag signal is provided; and
a tag signal generation unit configured to generate the tag signal,
wherein the modulation scheme conversion device multiplies a radio signal, which has been modulated with a first modulation scheme, and the tag signal to produce a multiplied signal and to reshape the multiplied signal with a second modulation scheme to produce a reshaped signal and backscatters the reshaped signal,
wherein the reshaping is performed in a physical (PHY) layer.

2. The modulation scheme conversion device of claim 1, wherein the radio signal modulated with the first modulation scheme and the multiplied signal modulated with the second modulation scheme have different bandwidths.

3. The modulation scheme conversion device of claim 1, wherein the radio signal modulated with the first modulation scheme includes in-phase (I) components and quadrature (Q) components, and
the tag signal is selected so that a signal obtained by multiplying the tag signal by the Q components is detected with the second modulation scheme.

4. The modulation scheme conversion device of claim 1, wherein the radio signal modulated with the first modulation scheme includes in-phase (I) components and quadrature (Q) components, and
the tag signal is selected so that a signal obtained by multiplying the tag signal by the I components is not detected with the second modulation scheme.

5. The modulation scheme conversion device of claim 3, wherein the tag signal is selected so that a correlation operation value between a signal obtained by multiplying the tag signal by the I components and a keying signal of the second modulation scheme is less than a detection threshold of the second modulation scheme and a correlation operation value between the signal obtained by multiplying the tag signal by the Q components and the keying signal of the second modulation scheme is equal to or greater than the detection threshold of the second modulation scheme.

6. The modulation scheme conversion device of claim 1, wherein the radio signal modulated with the first modulation scheme is a signal based on a ZigBee protocol, and
the multiplied signal modulated with the second modulation scheme is received by a WiFi receiver based on an IEEE 802.11b protocol.

7. The modulation scheme conversion device of claim 6, wherein the modulation scheme conversion device is connected to communicate with the WiFi receiver based on the IEEE 802.11b protocol,
wherein the WiFi receiver based on the IEEE 802.11b protocol includes a decoding stack of the ZigBee protocol which decodes symbols of the multiplied signal from the reshaped signal.

8. The modulation scheme conversion device of claim 6, wherein the tag signal generation unit generates the tag signal to convert a ZigBee header bit sequence of the ZigBee protocol into a WiFi header bit sequence of the IEEE 802.11b protocol.

9. The modulation scheme conversion device of claim 8, wherein the tag signal generation unit provides the tag signal including an invert bit sequence and a non-invert bit sequence to convert a header of the tag signal based on the ZigBee protocol into a header of a signal based on the IEEE 802.11b protocol.

10. The modulation scheme conversion device of claim 1, wherein the radio signal modulated with the first modulation scheme includes in-phase (I) components and quadrature (Q) components, and
the tag signal is multiplied by the I components and the Q components, wherein the tag signal is selected so that a signal obtained by multiplying the tag signal by the Q components and a signal obtained by multiplying the tag signal by the I components are detected with the second modulation scheme.

11. The modulation scheme conversion device of claim 10, wherein the tag signal is selected so that a correlation operation value between the signal obtained by multiplying the tag signal by the I components and a keying signal of the second modulation scheme is equal to or greater than a detection threshold of the second modulation scheme and a correlation operation value between the signal obtained by multiplying the tag signal by the Q components and the keying signal of the second modulation scheme is equal to or greater than the detection threshold of the second modulation scheme.

12. The modulation scheme conversion device of claim 1, wherein the radio signal modulated with the first modulation scheme is a signal based on a Bluetooth low energy (BLE) protocol, and
the multiplied signal modulated with the second modulation scheme is a WiFi signal based on an IEEE 802.11b protocol.

13. The modulation scheme conversion device of claim 12, wherein the modulation scheme conversion device is connected to communicate with a WiFi receiver based on the IEEE 802.11b protocol,
wherein the WiFi receiver based on the IEEE 802.11b protocol includes a decoding stack of the BLE protocol which decodes symbols of the multiplied signal from the reshaped signal.

14. The modulation scheme conversion device of claim 13, wherein the tag signal generation unit generates the tag signal to convert a ZigBee header bit sequence of the BLE protocol into a WiFi header bit sequence of the IEEE 802.11b protocol.

15. The modulation scheme conversion device of claim 1, wherein the modulation scheme conversion device is connected to communicate with a second modulation scheme receiver connected to the Internet and functions as a gateway.

16. The modulation scheme conversion device of claim 1, further comprising an energy harvesting unit configured to collect energy,
wherein the modulation scheme conversion device operates with the energy collected by the energy harvesting unit.

17. The modulation scheme conversion device of claim 16, wherein the energy harvesting unit comprises:
any one of a panel configured to collect energy through a photoelectric effect and an antenna configured to collect energy from electric waves; and
an electric storage unit configured to store the collected energy.

18. The modulation scheme conversion device of claim 1, wherein the first modulation scheme is amplitude shift keying (ASK),
the second modulation scheme is quadrature amplitude modulation (QAM), and
the tag signal is selected to shift a phase of the multiplied signal by any one angle of 45 degrees and 135 degrees.

* * * * *